US012631719B2

(12) United States Patent　　　　(10) Patent No.:　US 12,631,719 B2
Kuhn et al.　　　　　　　　　　　　(45) Date of Patent:　May 19, 2026

(54) RADAR DETECTOR USING POSITION DETECTION

(71) Applicant: CEDAR ELECTRONICS HOLDINGS CORP., Rolling Meadows, IL (US)

(72) Inventors: John Kuhn, Montgomery, OH (US); Gail Babitt, Keller, TX (US)

(73) Assignee: CEDAR ELECTRONICS HOLDINGS CORP., Rolling Meadows, IL (US)

( * ) Notice: Subject to any disclaimer, the term of this patent is extended or adjusted under 35 U.S.C. 154(b) by 336 days.

(21) Appl. No.: 18/231,658

(22) Filed: Aug. 8, 2023

(65) Prior Publication Data

US 2024/0053434 A1　　Feb. 15, 2024

Related U.S. Application Data

(63) Continuation-in-part of application No. 17/886,159, filed on Aug. 11, 2022, now Pat. No. 12,474,439.

(51) Int. Cl.
　G01S 7/02　　　(2006.01)
　G01C 21/36　　　(2006.01)
　　　　(Continued)

(52) U.S. Cl.
　CPC ............... G01S 7/022 (2013.01); G01C 21/36 (2013.01); G01S 7/4806 (2013.01); G01S 19/07 (2013.01); G01S 19/14 (2013.01); G01S 19/46 (2013.01)

(58) Field of Classification Search
None
See application file for complete search history.

(56) References Cited

U.S. PATENT DOCUMENTS 3,023,236 A　2/1962　Fike
3,574,283 A　4/1971　Albers
　　　(Continued)

FOREIGN PATENT DOCUMENTS

JP　　　63275913　A　11/1988
JP　　09-027096　A　　1/1997
JP　　2000131089　A　　5/2000
WO　　　97/08839　A2　　3/1997
WO　　　00/29869　A1　　5/2000

OTHER PUBLICATIONS

Cobra Electronics Once Again Leads Radar Detection Market, Debuting Its Exclusive SmartMute Products at Retailers Nation wide, PR Newswire. New York, 2002.
　　　(Continued)

*Primary Examiner* — Whitney Moore
(74) *Attorney, Agent, or Firm* — K&L Gates LLP

(57)　　　　ABSTRACT
Provided is a radar detector that aids in management of unimportant sources, dynamically improving handling of such sources based upon previously-stored geographically-referenced information on such sources. The detector determines location of the detector, and compares it to locations of known sources, to improve handling of such detections. The detector may ignore detections received in an area known to contain a stationary source, or may only ignore specific frequencies or handle frequencies differently based upon historic trends of spurious police radar signals at each frequency, or based on geofenced locations. GPS is used to establish current physical coordinates. The detector maintains a list of the coordinates of known stationary source "offenders" and geofence coordinates or boundaries in non-volatile memory. When a microwave or laser source is detected, it may compare current coordinates to geofence boundaries and/or sources in this list. Notification varies depending on the stored information and current operating modes.

19 Claims, 12 Drawing Sheets

(51) Int. Cl.

| | |
|---|---|
| *G01S 7/48* | (2006.01) |
| *G01S 19/07* | (2010.01) |
| *G01S 19/14* | (2010.01) |
| *G01S 19/46* | (2010.01) |

(56) References Cited

U.S. PATENT DOCUMENTS

| | | | |
|---|---|---|---|
| 3,660,844 | A | 5/1972 | Potter |
| 3,793,635 | A | 2/1974 | Potter |
| 3,856,991 | A | 12/1974 | Kirkland et al. |
| 4,025,920 | A | 5/1977 | Reitboeck et al. |
| 4,146,892 | A | 3/1979 | Overman et al. |
| 4,257,273 | A | 3/1981 | Knowd |
| 4,313,216 | A | 1/1982 | Jaeger et al. |
| 4,347,573 | A | 8/1982 | Friedland |
| 4,413,522 | A | 11/1983 | Leatherwood et al. |
| 4,416,522 | A | 11/1983 | Webster |
| 4,424,511 | A | 1/1984 | Alberts, Jr. |
| 4,467,651 | A | 8/1984 | Peters et al. |
| 4,467,681 | A | 8/1984 | Oeming |
| 4,492,952 | A | 1/1985 | Miller |
| 4,539,642 | A | 9/1985 | Mizuno et al. |
| 4,581,769 | A | 4/1986 | Grimsley et al. |
| 4,631,542 | A | 12/1986 | Grimsley |
| 4,750,215 | A | 6/1988 | Biggs |
| 4,829,441 | A | 5/1989 | Mandle et al. |
| 4,862,175 | A | 8/1989 | Biggs et al. |
| 4,876,527 | A | 10/1989 | Oka et al. |
| 4,906,999 | A | 3/1990 | Harrah et al. |
| 4,908,767 | A | 3/1990 | Scholl et al. |
| 4,949,088 | A | 8/1990 | Ryan et al. |
| 4,954,828 | A | 9/1990 | Orr |
| 4,986,365 | A | 1/1991 | Shieh |
| 5,038,102 | A | 8/1991 | Glasheen |
| 5,049,885 | A | 9/1991 | Orr |
| 5,058,698 | A | 10/1991 | Yoshida et al. |
| 5,068,663 | A | 11/1991 | Valentine et al. |
| 5,079,553 | A | 1/1992 | Orr |
| 5,083,129 | A | 1/1992 | Orr |
| 5,127,487 | A | 7/1992 | Yamamoto et al. |
| 5,134,406 | A | 7/1992 | Orr |
| 5,146,226 | A | 9/1992 | Valentine et al. |
| 5,151,701 | A | 9/1992 | Valentine et al. |
| 5,153,512 | A | 10/1992 | Glasheen |
| 5,164,729 | A | 11/1992 | Decker et al. |
| 5,177,685 | A | 1/1993 | Davis et al. |
| 5,206,500 | A | 4/1993 | Decker et al. |
| 5,206,651 | A | 4/1993 | Valentine et al. |
| 5,223,844 | A | 6/1993 | Mansell et al. |
| 5,250,951 | A | 10/1993 | Valentine et al. |
| 5,300,932 | A | 4/1994 | Valentine et al. |
| 5,305,007 | A | 4/1994 | Orr et al. |
| 5,347,120 | A | 9/1994 | Decker et al. |
| 5,365,055 | A | 11/1994 | Decker et al. |
| 5,400,034 | A | 3/1995 | Smith |
| 5,450,329 | A | 9/1995 | Tanner |
| 5,485,161 | A | 1/1996 | Vaughn |
| 5,504,482 | A | 4/1996 | Schreder |
| 5,506,587 | A | 4/1996 | Lans |
| 5,510,793 | A | 4/1996 | Gregg et al. |
| 5,515,042 | A | 5/1996 | Nelson |
| 5,530,447 | A | 6/1996 | Henderson et al. |
| 5,539,645 | A | 7/1996 | Mandhyan et al. |
| 5,559,508 | A | 9/1996 | Orr et al. |
| 5,668,554 | A | 9/1997 | Orr et al. |
| 5,717,398 | A | 2/1998 | Pollin |
| 5,796,655 | A | 8/1998 | Reed et al. |
| 5,805,079 | A | 9/1998 | Lemelson |
| 5,815,092 | A | 9/1998 | Gregg et al. |
| 5,864,481 | A | 1/1999 | Gross et al. |
| 5,907,293 | A | 5/1999 | Tognazzini |
| 5,926,117 | A | 7/1999 | Gunji et al. |
| 5,929,753 | A | 7/1999 | Montague |
| 5,936,574 | A | 8/1999 | Klaschka |
| 5,955,973 | A | 9/1999 | Anderson |
| 5,977,884 | A | 11/1999 | Ross |
| 5,983,161 | A | 11/1999 | Lemelson et al. |
| 6,023,235 | A | 2/2000 | Sauer |
| 6,023,236 | A | 2/2000 | Shelton |
| 6,049,301 | A | 4/2000 | Weagant |
| 6,084,510 | A | 7/2000 | Lemelson et al. |
| 6,118,403 | A | 9/2000 | Lang |
| 6,154,166 | A | 11/2000 | Sawada et al. |
| 6,154,766 | A | 11/2000 | Yost et al. |
| 6,163,277 | A | 12/2000 | Gehlot |
| 6,201,493 | B1 | 3/2001 | Silverman |
| 6,204,798 | B1 | 3/2001 | Fleming, III |
| 6,252,544 | B1 | 6/2001 | Hoffberg |
| 6,378,354 | B1 | 4/2002 | Sharp |
| 6,384,776 | B1 | 5/2002 | Martin |
| 6,400,304 | B1 | 6/2002 | Chubbs, III |
| 6,474,683 | B1 | 11/2002 | Breed et al. |
| 6,480,103 | B1 | 11/2002 | McCarthy et al. |
| 6,567,035 | B1 | 5/2003 | Elliott |
| 6,587,068 | B2 | 7/2003 | Kuhn et al. |
| 6,600,409 | B2 | 7/2003 | Cohen |
| 6,614,385 | B2 | 9/2003 | Kuhn et al. |
| 6,640,609 | B1 | 11/2003 | Nadkarni et al. |
| 6,670,905 | B1 | 12/2003 | Orr |
| 6,718,239 | B2 | 4/2004 | Rayner |
| 6,750,785 | B2 | 6/2004 | Trajkovic et al. |
| 6,836,238 | B1 | 12/2004 | Orr et al. |
| 6,895,324 | B2 | 5/2005 | Straub |
| 6,973,377 | B2 | 12/2005 | Majstorovic et al. |
| 6,985,753 | B2 | 1/2006 | Rodriguez et al. |
| RE39,038 | E | 3/2006 | Fleming, III |
| 7,013,207 | B2 | 3/2006 | Majstorovic et al. |
| 7,023,374 | B2 | 4/2006 | Jossef et al. |
| 7,098,844 | B2 | 8/2006 | Orr et al. |
| 7,113,107 | B2 | 9/2006 | Taylor |
| 7,124,006 | B2 | 10/2006 | Davidson et al. |
| 7,183,942 | B2 | 2/2007 | Rock et al. |
| 7,247,159 | B2 | 7/2007 | Lorenzo et al. |
| 7,298,248 | B2 | 11/2007 | Finely et al. |
| 7,301,494 | B2 | 11/2007 | Waters |
| 7,362,239 | B2 | 4/2008 | Franczyk et al. |
| 7,397,416 | B2 | 7/2008 | Orr et al. |
| 7,411,493 | B2 | 8/2008 | Smith |
| 7,471,236 | B1 | 12/2008 | Pitt et al. |
| RE40,653 | E | 3/2009 | Fleming, III |
| 7,576,679 | B1 | 8/2009 | Orr et al. |
| 7,764,219 | B2 | 7/2010 | Pitt et al. |
| 7,804,440 | B1 | 9/2010 | Orr |
| 8,525,723 | B2 | 9/2013 | Orr et al. |
| 2001/0013835 | A1 | 8/2001 | Hsu et al. |
| 2002/0022920 | A1 | 2/2002 | Straub |
| 2002/0067286 | A1 | 6/2002 | Hsu et al. |
| 2002/0100310 | A1 | 8/2002 | Begin |
| 2002/0113727 | A1 | 8/2002 | Kuhn et al. |
| 2002/0116156 | A1 | 8/2002 | Remboski et al. |
| 2002/0135504 | A1 | 9/2002 | Singer |
| 2003/0052797 | A1 | 3/2003 | Rock et al. |
| 2003/0067407 | A1 | 4/2003 | Kuhn et al. |
| 2003/0084704 | A1 | 5/2003 | Hanse |
| 2003/0139150 | A1 | 7/2003 | Rodriguez et al. |
| 2003/0218562 | A1 | 11/2003 | Orr |
| 2006/0055583 | A1 | 3/2006 | Orr et al. |
| 2006/0132349 | A1 | 6/2006 | Stern et al. |
| 2006/0284756 | A1 | 12/2006 | Orr et al. |
| 2007/0006708 | A1 | 1/2007 | Laakso |
| 2007/0109187 | A1 | 5/2007 | Murphy |
| 2007/0266178 | A1 | 11/2007 | Wong et al. |
| 2010/0317420 | A1 | 12/2010 | Hoffberg |
| 2011/0241923 | A1* | 10/2011 | Chernukhin ........... G01S 7/022 |
| | | | 342/20 |

OTHER PUBLICATIONS

Cobra Electronics Awarded Four Prestigious Innovations Awards for 2002 Products, PR newswire, New York, Jan. 3, 2002.
Cobra Operating Manual, IntelliLinka Wireless Remote Series XRS-R9G, Copyright 2007.

(56) References Cited

OTHER PUBLICATIONS

Cobra XRS 9965 15 Band Radar and Laser Detector: Car Electronics amazon.com, accessed on Oct. 5, 2012.

Chalko, High accuracy speed measurement using GPS (Global Positioning System): Scientific Engineering Research P/L.

Hafr, et al. Numerically Stable Direct Least Squares fitting of Ellipses, Institute of Information Theory and Automation Library; Academy of Sciences of Czech Republic, 2002.

Drubin, et al.; Integrated automotive sensors, Microwave Theory and Techniques, IEEE Transactions on, vol. 50 Issue: 3, 2002.

International Patent Office, International Search Report for PCT/US2010/024915.

Motor Trend Magazine Blog, It's Not a Radar Detector. It's a Trapster, posted Nov. 12, 2008, printed Aug. 19, 2009.

Reach unlimited Corporation, Trapster—Speed Trap Sharing System, Webpage printed 2009.

Sixnet Newsletter, Industrial Cellular Modems—Sixnet, Webpage Printed 2009.

Small Systems Specialists, Using your car's Vehicle Speed Sensor, ALFA Checkpoint Rally Clock-Instruction manual, http://rally.cc/Subaru.htm, 2002.

Tracker TEL GPS, Enforma GPS Modem—GPS Tracking Products and Services, Webpage printed 2009.

Jeong et al., Two novel radar vehicle detectors for the replacement of a conventional loop detector. Microwave Journal Euro-Global Edition, Jul. 2001, vol. 44, No. 7.

UNIDEN GPSRD Owner's Manual.

UNIDEN Setting Industry Standard with GPS RD.

Weblogs, Inc., Free iPhone App Prevents Speeding Tickets, Webpage printed 2009.

Weinberg, Harvey, Embedding Temperature Information in the ADXL 202's PWM Outputs, Techinical Note, One Technology Way, 1998.

Weinberg, Harvey, Using the AXDL 202 Duty Cycle Output, Techincal Note, One Technology Way, 1998.

Peng et al., A vector based gyro free intertial navigation system by integrating existing accelerometer network in a passenger vehicle. Plans, 2004.

U.S. Appl. No. 60/139,097, filed Jun. 1999, Steven K. Orr.

U.S. Appl. No. 60/145,394, filed Jul. 1999, Steven K. Orr.

U.S. Appl. No. 60/108,362, filed Nov. 13, 1988, Brook Lang.

* cited by examiner

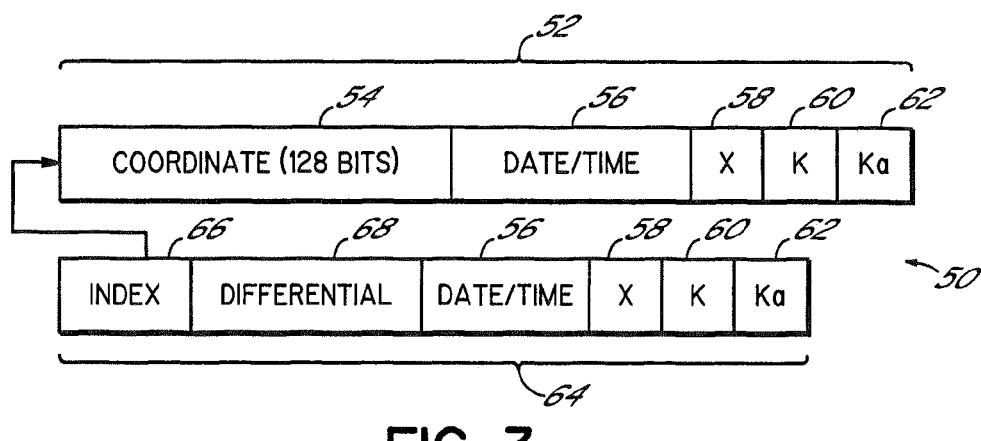
FIG. 3
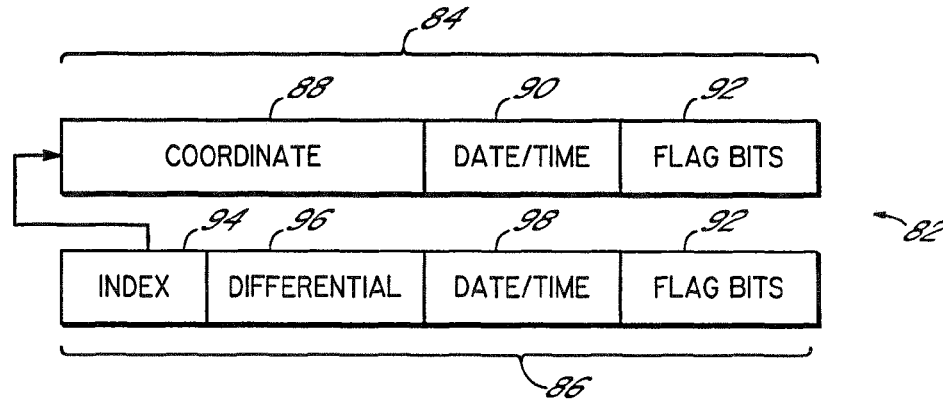
FIG. 4
FIG. 5

RADAR DETECTOR USING POSITION DETECTION

CROSS-REFERENCES TO RELATED APPLICATIONS

The present disclosure is a continuation-in-part application claiming priority to U.S. patent application Ser. No. 17/886,159, filed Aug. 11, 2022, the entirety of which is incorporated by reference herein.

TECHNOLOGICAL FIELD

The present invention relates to radar warning receivers.

BACKGROUND OF THE INVENTION

Radar detectors warn drivers of the use of police radar, and the potential for traffic citations if the driver exceeds the speed limit. The FCC has allocated several regions of the electromagnetic spectrum for police radar use. The bands used by police radar are generally known as the X, K and Ka bands. Each relates to a different part of the spectrum. The X and K bands are relatively narrow frequency ranges, whereas the Ka band is a relatively wide range of frequencies. By the early 1990's, police radar evolved to the point that it could operate almost anywhere in the 1600-megahertz wide Ka band. During that time radar detectors kept pace with models that included descriptive names like "Ultra Wide" and "Super Wide." More recently, police have begun to use laser (optical) systems for detecting speed. This technology was termed LIDAR for "Light Detection and Ranging."

Radar detectors typically comprise a microwave receiver and detection circuitry that is typically realized with a microprocessor or digital signal processor (DSP). Microwave receivers are generally capable of detecting microwave components in the X, K, and very broad Ka band. In various solutions, either a microprocessor or DSP is used to make decisions about the signal content from the microwave receiver. Systems including a digital signal processor have been shown to provide superior performance over solutions based on conventional microprocessors due to the DSP's ability to find and distinguish signals that are buried in noise. Various methods of applying DSP's were disclosed in U.S. Pat. Nos. 4,954,828, 5,079,553, 5,049,885, and 5,134,406, each of which is hereby incorporated by reference herein.

Police use of laser has also been countered with laser detectors, such as described in U.S. Pat. Nos. 5,206,500, 5,347,120 and 5,365,055, each of which is incorporated herein by reference. Products are now available that combined laser detection into a single product with a microwave receiver, to provide comprehensive protection.

The DSP or microprocessor in a modern radar detector is programmable. Accordingly, they can be instructed to manage all of the user interface features such as input switches, lights, sounds, as well as generate control and timing signals for the microwave receiver and/or laser detector. Early in the evolution of the radar detector, consumers sought products that offered a better way to manage the audible volume and duration of warning signals. Good examples of these solutions are found in U.S. Pat. Nos. 4,631,542, 5,164,729, 5,250,951, and 5,300,932, each of which is hereby incorporated by reference, which provide methods for conditioning the response generated by the radar detector.

Methods for conditioning detector response are gaining importance, because there is an increasing number of signals present in the X, K, and Ka bands from products that are completely unrelated to police radar. These products share the same regions of the spectrum and are also licensed by the FCC. The growing number of such signals has undermined the credibility of radar detector performance. Radar detectors cannot tell the difference between emissions from many of these devices and true police radar systems. As a result, radar detectors are increasingly generating false alarms, effectively "crying wolf", reducing the significance of warnings from radar detectors.

One of the earliest and most prevalent unrelated Microwave sources is the automatic door system used in many commercial buildings such as supermarkets, malls, restaurants and shopping centers. The majority of these operate in the X-Band and produce signals virtually indistinguishable from conventional X-Band Police Radar. Other than the fact that door opening systems are vertically polarized, vs. circular polarization for some police radar (e.g., K band), there is often no distinction between the two that could be analyzed and used by a receiver design (e.g., for vertically polarized X and Ka band police radar).

Until recently, virtually all of the door opening systems were designed to operate in the X-Band. As a result, radar detectors generally announced X-Band alerts far more often than K-Band. As these X-Band 'polluters' grew in numbers, ultimately 99% of X-Band alerts were from irrelevant sources. X-Band alerts became meaningless. The only benefit that these sources offered the user was some assurance that the detector was actually capable of detecting radar. It also gave the user some intuition into the product's detection range. To minimize the annoyance to users, most radar detector manufacturers added a filter-like behavior that was biased against X-Band sources. Many also added "Band priority" that was biased against X and in favor of bands that were less likely to contain irrelevant sources such as K, Ka, and Laser. If signals in both X and K Bands were detected, band prioritization would announce K, since it was more likely be a meaningful signal to the driver. In the following years, K-Band door opening systems have also grown in number. This has reduced the significance of the K-Band warning and further undercut the overall benefit to the user of a radar detector.

Another unrelated microwave signal is generated by traffic management systems that uses X and K band signals, such as the ARTIMIS manufactured by TRW, used in Cincinnati, Ohio. ARTIMIS Stands for "Advanced Regional Traffic Interactive Management and Information System", and reports traffic flow information back to a central control center. Traffic congestion and other factors are analyzed by the control center. Control center employees use this information to formulate routing suggestions and other emergency information, which they transmit to a large distribution of overhead and roadside signs. In order to collect information on vehicle traffic, a roadside ARTIMIS station transmits an X-Band signal toward cars as they drive by. The ARTIMIS source, unlike the X-Band door opener systems, is distinguishable from police radar as it is not transmitted at a single fixed frequency. As a result, it is possible to differentiate police radar signals from sources such as ARTIMIS, and ignore ARTIMIS sources in newer detectors. Older detectors, however, do not incorporate this feature and could be obsolete in areas where ARTIMIS is in use.

Unrelated Microwave signals are also transmitted by a system called the RASHID VRSS. Rashid is an acronym for Radar Safety Brake Collision Warning System. This electronic device warns heavy trucks and ambulances of hazards in their path. A small number of these RASHID VRSS units have been deployed. They are categorized as a member of the 'non-stationary' set of unrelated sources. As in the ARTIMIS example, detection of RASHID can be prevented.

Perhaps the biggest source of non-stationary unrelated sources is from other radar detectors. These are sometimes referred to as "polluting radar detectors," and present a serious threat to some detector products. An early example of this occurred in the mid 1980's when radar detectors using superhomodyne circuitry became popular. Such detectors leak energy in the. X- and K-bands and appeared as police radar to other detectors. A solution to this problem is described in U.S. Pat. No. 4,581,769, which is hereby incorporated by reference in its entirety. A similar problem occurred in the early 1990's when the Ka band was widened. An unexpected result was that the wider Ka band then also detected harmonics of signals generated by local oscillators within many existing radar detectors. U.S. Pat. No. 5,305, 007, which is hereby incorporated by reference in its entirety, describes a method for ignoring these polluting detectors.

At this time, there are very few signal sources that can cause false laser detections in comparison to the substantial list of false microwave signals just described. However there are certain types of equipment that can cause the amplifiers and detection circuitry used in a laser detector to generate a "false" detect. In particular, certain locations near airports have been demonstrated to cause such problems for various laser detector products. As a result, selected airport environments are examples of stationary signals that produce false laser detections.

As can be appreciated from the foregoing example, as sources of unrelated signals continue to propagate, radar detectors have continually increased in sophistication to filter unrelated sources and accurately identify police radar. Each of these changes and enhancements has the potential effect of obsoleting existing detectors that do not include appropriate countermeasures. Furthermore, some sources, particularly stationary door opener sources, at this time cannot be filtered economically, and thus threaten the usefulness of even the most sophisticated modern radar detector.

During the 1980's, the functionality of radar detectors expanded into other classes of driver notification. A system was developed that required a special transmitter be placed on emergency vehicles, trains, and other driving hazards. The term 'emergency radar' was coined, and a variety of products were introduced that could detect these transmitters. One such solution was disclosed in U.S. Pat. No. 5,559,508, which is hereby incorporated by reference herein in its entirety. Another system was later introduced offering a larger class of 'hazard categories' called the SWS system. Both emergency radar and SWS involve the transmission of microwave signals in the 'K' band. Such signals are considered to be a part of the group of signal types that are intended to be detected by radar detectors.

A drawback of these warning systems is that stationary transmitters of these signals send the same message to drivers constantly, and become a nuisance during daily commute. This is beneficial to 'new' drivers receiving the message for the first time. However these messages become an annoyance to drivers who follow the same path to work every day.

Thus, radar detector manufacturers are continually confronted with new problems to solve, due to the variety of different types of unrelated sources and their sheer numbers. The rate at which new or upgraded radar detector models are introduced continues to increase as manufacturers try to evolve their products to manage the growing number of unrelated sources. Meanwhile, the market for radar detectors is shrinking because consumers are no longer interested in buying products that so quickly become obsolete.

SUMMARY

The present disclosure overcomes these difficulties by providing a method of operating a GPS enabled radar detector that aids in the management of unrelated sources, and permitting the detector to dynamically improve its handling of unrelated sources. As noted above, many non-stationary sources can be identified and ignored using existing technology. However, many stationary sources cannot, as yet be effectively filtered economically with existing technology. Accordingly, the disclosure provides a radar detector that includes technology for determining the location of the detector, and comparing this location to the locations of known stationary sources and geofenced areas, to improve the handling of such detections.

In one embodiment, a radar detector may ignore detections received in an area known to contain a stationary source. In the specific embodiment described below, substantially more sophisticated processing is performed to determine whether and what actions to take in response to a detection. Also, the radar detector may ignore detections received in a geofenced area to reduce processing required by the radar detector.

The Global Positioning Satellite System (GPS) offers an electronic method for establishing current physical coordinates very accurately. In the detailed embodiment described below, a radar detector utilizes a GPS system to determine its current position. The detector also maintains a list of the coordinates of the known stationary source "offenders" in nonvolatile memory. Each time a microwave or laser source is detected, it may compare its current coordinates to this list. Notification of the driver will take on a variety of forms depending on the setup configuration.

By adding GPS conditioning capabilities to a radar detector, the combination is a product category that is capable of rejecting signals from any given location no matter what the nature of the microwave/laser signals might be from that location. This may have a dramatic effect on the usable life of the product and subsequent value to its owner.

Additionally, this disclosure provides a radar detector device comprising a receiver device configured to detect a plurality of signals generated in a context of law enforcement activity across a plurality of different frequency ranges; and a processor, wherein the processor is configured to: detect a position of the radar detector device; determine that the radar detector device is located in a geofenced area; adjust a sensitivity of the radar detector device to signals in a first frequency band within the geofenced area; suppress alarms based on the adjusted sensitivity for to signals in a the first frequency band within the geofenced area; and detect signals in the first frequency band and signals in a second frequency band within the geofenced area.

The above and other objects and advantages of the present disclosure shall be made apparent from the accompanying drawings and the description thereof

BRIEF DESCRIPTION OF THE DRAWINGS

The accompanying drawings, which are incorporated in and constitute a part of this specification, illustrate embodiments of the disclosure and, together with a general description of the disclosure given above, and the detailed description of the embodiments given below, serve to explain the principles of the disclosure.

FIG. 3 is an illustration of a database structure used by the radar detection circuit of FIG. 2, for storing information radar signals received or receivable from unrelated sources at a number of locations, as identified by cell coordinates;

FIG. 4 is an illustration of a database structure used for storing historic information on the locations of a vehicle carrying the radar detection circuit of FIG. 2, as identified by cell coordinates;

FIG. 5 is an illustration of a database structure used for storing flags identifying various conditions at a number of locations, as identified by cell coordinates;

Figure 1:
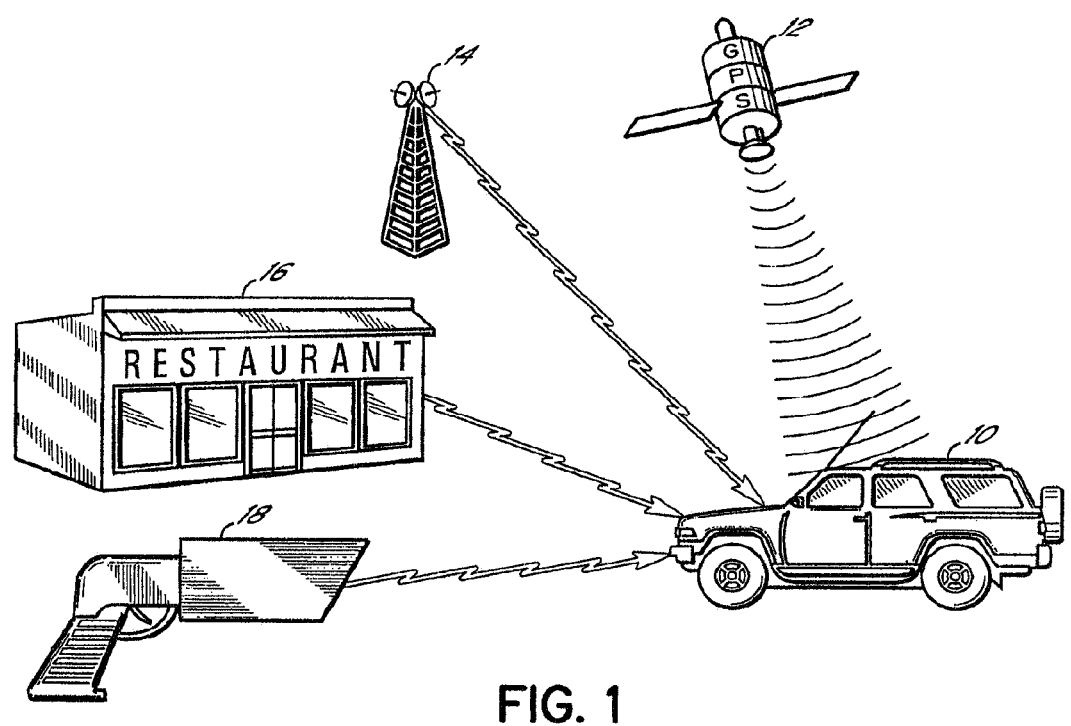
FIG. 1 is an illustration of a vehicle receiving radar signals from police radar and from a number of unrelated sources, and further receiving global positioning signals from a global positioning satellite.

DETAILED DESCRIPTION OF EXAMPLE
EMBODIMENTS

To provide background for the present disclosure, including the evolution of radar technology, a summary of GPS (Global Positioning System) technology over time will now be provided. GPS is a mature technology that provides a method for a GPS receiver to determine its relative location and velocity at any time. The (GPS) system is a worldwide constellation of at least 24 satellites and their ground stations. GPS receivers on earth use 'line of sight' information from these satellites as reference points to calculate positions accurate to a matter of meters. Advanced forms of GPS actually enable measurements to within a centimeter. The Global Positioning System consists of three segments: a space segment of 24 orbiting satellites (or more), a control segment that includes a control center and access to overseas command stations, and a user segment, consisting of GPS receivers and associated equipment. Over time GPS receivers have been miniaturized to just a few integrated circuits and have become very economical.

An unfortunate side effect of the GPS system is that it can be used by enemy forces, as GPS signals can be picked up by any receiver including both domestic and foreign. When the United States Department of Defense devised the GPS system they incorporated a feature that prevents high precision measurements unless the receiver is equipped with special military 'keys.' This was accomplished with the intentional introduction of "noise" into the satellite's clock data which adds noise (or inaccuracy) into position calculations. The DOD sometimes also sent slightly erroneous orbital data to the satellites, which is transmitted back to receivers on the ground. This intentional degradation is referred to as "Selective Availability" or "SA" error. Military receivers used a decryption key to remove the SA errors. As a result of the SA error, there were two classes of GPS service, "Standard Positioning Service (SPS) and "Precise Positioning System" (PPS). These classes were realized by having GPS satellites transmit two different signals: the Precision or P-code and the Coarse Acquisition or C/A-code. The P-code was designed for authorized military users and provides PPS service. To ensure that unauthorized users do not acquire the P-code, the DOD can engage an encryption segment on the P-code called anti-spoofing (AS). The C/A-code was designed for use by nonmilitary users and provides SPS service. The C/A-code is less accurate and easier to jam than the P-code. It is also easier to acquire, so military receivers first track the C/A-code and then transfer to the P-code. Selective availability was achieved by degrading the accuracy of the C/A-code, although selective availability was discontinued years ago.

The precision of SPS was stated as providing 100-meter horizontal and 156 meter vertical accuracy "95% of the time." PPS was only available for the U.S. and allied military, certain U.S. Government agencies, and selected civil users specifically approved by the U.S. Government. PPS provided 22 meters horizontal and 22.7 meters vertical accuracy 95% of the time.

Other than intentional errors inserted by the DOD, there were a variety of other error sources that vary with terrain and other factors. GPS satellite signals are blocked by most materials. GPS signals may not pass through buildings, metal, mountains, or trees. Leaves and jungle canopy can attenuate GPS signals so that they become unusable. In locations where at least four satellite signals with good geometry cannot be tracked with sufficient accuracy, GPS is unusable.

The "Differential GPS" system was developed in order to compensate for the inaccuracy of GPS readings. A high-performance GPS receiver (known as a reference station or beacon) is placed at a specific location; the information it receives is then compared to the receiver's location and corrects the SA satellite signal errors. The error data is then formatted into a correction message and transmitted to GPS users on a specific frequency (300 kHz). A true or arbitrary set of coordinates are assigned to the position occupied by a reference GPS receiver. The difference between these and the coordinates received via GPS at the reference is a very close approximation to the SA error at nearby sites. This error is nearly identical to the error calculated by any nearby GPS receiver. The reference site is sometimes referred to as a 'beacon,' as it constantly transmits these difference coordinates. A DGPS receiver is designed to receive both the GPS information and the beacon information. It generates a far more accurate estimate of its coordinates by applying the difference information to the GPS coordinates. The drawback to this is that the remote and reference receivers may not be using the same set of satellites in their computations. If this is the case, and the remote receiver incorporates the corrections, it may be accounting for satellite errors that are not included in its own measurement data. These corrections can make the differential solution worse than the uncorrected GPS position. To prevent this error, an improved form of differential GPS involves the derivation of the corrections to the actual measurements made at the reference receiver to each satellite. By receiving all of the corrections independently, the remote receiver can pick and choose which are appropriate to its own observations. This method of DGPS is most widely used. Typically, the DGPS correction signal loses approximately 1 m of accuracy for every 150 km of distance from the reference station.

The availability of Beacons of DGPS systems elevated the very threat that the SA error was intended to reduce. In the presence of such networks, potentially hostile weapons systems using DGPS could be developed relatively rapidly. For this reason and others, the SA error diminished in military significance and SA was discontinued, such that this error is no longer of relevance.

In the United States, the US Coast Guard (USCG) and Army Corps of Engineers (ACE) have constructed a network of Beacon stations that service the majority of the eastern United States, the entire length of both coastlines, and the Great Lakes. Further plans exist to increase the density of this network to provide dual redundant coverage throughout the continental US by the end of the year 2000 for a variety of applications including intelligent transportation system, infrastructure management, and public safety.

The Canadian Coast Guard (CCG) provides coverage in Canada for the St. Lawrence River, throughout the Great Lakes, and both coastlines. In total, there are over 160 stations operational worldwide with over 140 sites proposed to come online within the next two years. Coverage currently exists in many other regions of the world including Europe, Asia, Australia, Africa, and South America.

The beacons perform the differential calculation and broadcast this information by modulating the data onto a 300 kHz signal transmitted by the established network of Radiobeacons. The advantages of using the Beacon DGPS network include: (1) Free access to differential correction information; (2) Long range signal which penetrates into valleys, and travels around obstacles; (3) High quality differential corrections which are continuously monitored for integrity; and (4) Inexpensive user equipment.

The range of the 300 kHz signal is dependent upon a number of factors which include transmission power and conductivity of the surface over which the transmission is propagating. The Beacons within the global network broadcast at varying power. Typical broadcasting ranges for radiobeacons vary from as little as 35 nautical miles to as much as 300 nautical miles. Signals broadcast by DGPS radiobeacons are integrity monitored by remote stations for quality of beacon transmission, differential corrections, and GPS positional information. In addition, government agencies concerned with public safety have made it their mandate to ensure that beacon DGPS services are available 24 hours a day, 365 days a year. Performance requirements for marine applications dictate that an availability of 99% or greater is required if a particular system is to be used as a sole means of navigation. The US Coast Guard and Army Corps of Engineers Beacon Network, for example, offer this high level of availability free of charge to all civilian users.

There are other navigation systems in place, in addition to GPS, that merit review. LORAN-C is a ground-based radio navigation system. It operates on a frequency band of 90 kHz to 110 kHz (LF). It has an approximate range of hundreds to thousands of miles, and an accuracy of 0.25 nautical miles repeatable to 18-90 meters, with 95% confidence. Loran-C is a pulsed hyperbolic system that provides 0.25 nm predictable accuracy, 18-90 m repeatable accuracy, 95% confidence and 99.7% availability. Loran-C provides coverage for the continental U.S. and its coastal waters, the Great Lakes, and most of Alaska. Many other countries are also involved in the providing of Loran-C (or Loran-like) services, or are in negotiations with their neighbors to expand coverage. These countries include India, Norway, France, Ireland, Germany, Spain, Italy, Russia, China, Japan, the Philippines and others.

Omega is a low frequency band system with accuracy of 2 to 4 nautical miles with 95% confidence level. Developed by the United States, it is operated in conjunction with six other nations. OMEGA is a very low frequency, phase comparison, worldwide radionavigation system TACAN operates in the U.S. in a frequency band of 960 MHz-1215 MHz (UHF). It has a range of approximately 200 miles at high altitudes. TACAN is primarily used by U.S. and other military aircraft. TACAN radio stations are often co-located with civilian VOR systems allowing military aircraft to operate in civil airspace. The system provides the pilot with relative bearing and distance to the radio beacon.

VOR operates in a frequency band of 108.0 MHz-117.95 MHz (VHF). It has an approximate range of 250 miles, but accuracy as poor as 20 miles. VOR is a beacon-based navigation system operated in the U.S. by the Federal Aviation Administration (FAA) for civil aircraft navigation. When used by itself, the system allows users to determine their azimuth from the VOR station without using any directional equipment. VOR stations are radio beacons that transmit two signals. The first, called the reference signal, is transmitted with constant phase all around the transmitter. The second signal is phase shifted from the first depending on the compass direction of the user from the station. A simple, inexpensive receiver in the aircraft is used to determine the received phase difference of the two signals, and from that information the direction of the aircraft from the transmitter. By using two VOR stations, a specific location may be determined.

Of all the navigation systems mentioned, GPS offers better service, more accuracy, and more serviceable regions than any other approach. There were various classes of GPS service that improve accuracy at higher costs. These included the following categories: (1) Low-cost, single receiver SPS projects (100 meter accuracy); (2) Medium-cost, differential SPS code Positioning (1-10 meter accuracy); (3) High-cost, single receiver PPS projects (20 meter accuracy); (4) High-cost, differential carrier phase surveys (1 mm to 1 cm accuracy); and (5) High-cost, Real-Time-Kinematic (1 cm) with real time accuracy indications. Currently, without selective availability and with additional satellites (e.g., typically 5 or more with line of sight), high end receivers may have accuracy within 2 centimeters, SPS receivers are capable of 3.5 meter accuracy, and consumer devices (e.g., smartphone) may be accurate to within 4.9 meters. Assistive services like WiFi positioning may improve the accuracy available to these devices.

Referring now to FIG. 1, a vehicle 10 is illustrated in operation on a roadway, under exposure to radio frequency signals from a variety of sources. These include the GPS satellite system, LORAN or OMEGA radio towers, non-police sources of interference such as restaurant 16, and police radar signals from a radar gun 18. In accordance with principles of the present disclosure, vehicle 10 is equipped with a radar detector able to identify the present coordinates and/or velocity of the vehicle, e.g. using an associated GPS receiver or alternatively a receiver of land-based signals such as LORAN. The radar detector is able to use this information to enhance its decision-making abilities.

Figure 2:
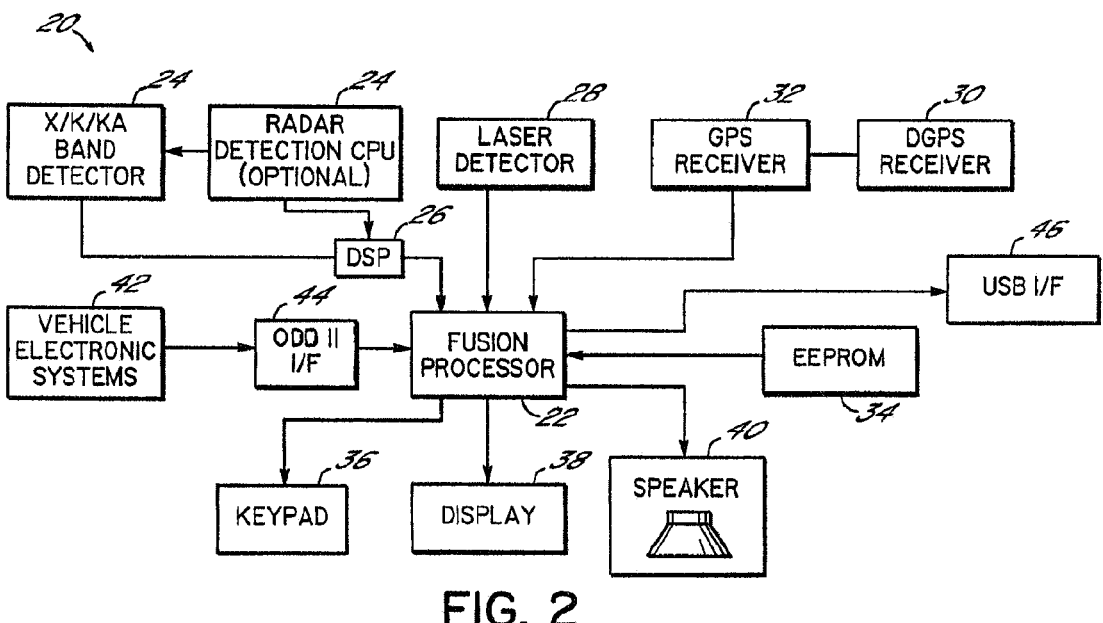
FIG. 2 is an electrical block diagram of a radar detection circuit in accordance with principles of the present disclosure.

Referring now to FIG. 2, the radar detector 20 in accordance with principles of the present disclosure includes a fusion processor 22 for controlling all functions of the unit. Fusion processor receives information on radar signals from a conventional microwave receiver 24, coupled to processor 22 via a digital signal processor (DSP) 26. Microwave receiver 24 and DSP 26 may utilize any of the techniques described above and in the above-referenced patents, for rejecting noise and increasing discrimination between actual and spurious police radar signals. Further, receiver 24 and DSP 26 may be controlled by an optional second CPU 25, which can enable additional signal evaluation beyond that which is possible using a DSP.

Processor 22 is further connected to a laser detector 28 for detecting police LIDAR signals. Processor 22 is further connected to a GPS receiver 32 and a separate differential GPS (DGPS) receiver 30, such that differential GPS methodologies may be used where beacon signals are available. Since the radar detector application described in this patent is not a candidate for military class service, it is not able to access the more accurate PPS. However it is considered a "civil user" and can use the SPS without restriction.

Processor 22 executes a stored program, found in an electrically erasable programmable read only memory (EEPROM) 34, flash memory, or masked read only memory (ROM). The processor is programmed to manage and report detected signals in various ways depending on its stored program. This programming includes functions for "detector response conditioning," as elaborated below, e.g., with reference to FIGS. 6A through 6D.

The radar detector further incorporates a user input keypad or switches 36. Operational commands are conveyed by the user to processor 22 via the keypad. Processor 22 is further connected to a display 38, which may comprise one or more light emitting diodes for indicating various status conditions, or in a more feature-rich device, may include an alphanumeric or graphical display for providing detailed information to a user. A speaker 40 is also provided to enable processor 22 to deliver audible feedback to a user under various alert conditions, as is elaborated below.

Processor 22 may further include an interface 44, such as an ODB II compliant interface, for connection to vehicle electronic systems 42 that are built into the vehicle 10. Modern vehicles are being equipped with standardized information systems using the so-called OBD II standard interface. This standard interface is described in an article entitled ODB II Diagnostics, by Larry Carley, from Import Car, January 1997, which is hereby incorporated herein by reference. Processor 22, using the OBD II standard interface 44, can obtain vehicle speed and other vehicle status information directly from the vehicle, and then may use this information appropriately as described in more detail below.

Processor 22 is further coupled to a Universal Serial Bus (USB) interface 46 that provides a means for uploading and downloading information to and from processor 22. Specifically, USB interface 46 may be used to automate the assimilation of coordinate information into data structures in EEPROM 34, as described below with reference to FIGS. 3 through 5. USB interface 46 may also be used to interface the detector to a separate host computer or product application containing a larger storage capacity than available from internal memory. Remote storage devices may include any form of dynamically allocatable storage device (DASD) such as a hard disk drive, removable or fixed magnetic, optical or magneto-optical disk drive, or removable or fixed memory card, or any device including a dynamic directory structure or table of contents included in the storage format to permit dynamic storage allocation. The host computer or other connected device need not be visible to the driver and may be in any convenient location, such as under the vehicle dash.

Coordinate information can be stored, e.g., on a hard drive organized with an indexed database structure to facilitate rapid retrieval, and the hard drive may include a special purpose processor to facilitate rapid retrieval of this information. Additionally or alternatively, flash drive, flash memory, and/or an SD card may be used to facilitate rapid retrieval of the database structure to obtain this coordinate information.

Where a general purpose host computer is connected via the USB interface, it will likely be based on a higher scale CPU chip and thus be able to efficiently carry out complex coordinate comparison tasks such as are described below, and such tasks may be delegated to the host CPU rather than carried out in fusion processor 22. The host CPU can also anticipate the need for information about particular coordinates based upon vehicle movements, and respond by retrieving records within proximity of the current location for ready delivery to fusion processor 22. The host computer can also provide navigational functions to the driver, potentially using stored signal information and flag bits to provide the user with location-specific information about driving hazards and potential police stakeout locations.

Signal information may also be downloaded from other hosts, for example, a connection may be established directly via the USB interface to an Internet site carrying signal information, such as the Internet sites EscortRadar.com or Cobra.com, or an application such as iRadar, ESCORT Live, or Drive Smarter®. An indirect Internet connection may also be established via a host computer. Furthermore, connections may be established between two receivers, e.g. a trained receiver having extensive signal information, and a receiver having less extensive information, to transfer signal information between the receivers so that either or both has a more complete set of signal information. Any other suitable communication interface (e.g., Bluetooth, WiFi, etc.) may be employed to communicate with an Internet site, web application, or the like.

Generally speaking, processor 22 compares the radar detector's immediate coordinates with a stored list of the coordinates of unwanted stationary sources and may also determine when the radar detector is within a geofenced area, as will be discussed further below. If the radar detector receives a microwave/laser signal within a certain distance of one of these pre-designated sources, processor 22 applies additional constraints to the detection criterion before alerting the user. Since stationary radar sources make up the bulk of the unwanted sources, there is a significant benefit resulting from these functions. Further details on these operations are provided below with reference to FIGS. 6A through 6D.

FIG. 3 illustrates data structures 50 stored in EEPROM 34 and used for managing information utilized in accordance with principles of the present disclosure. As seen in FIG. 3, these data structures include a plurality of main entries 52, each including a field 54 for a coordinate, a field 56 for identifying the date and time data was collected, and three fields 58, 60 and 62 providing information on the source.

Field 54 provides the coordinate of a "cell" of space. As will be elaborated below, coordinates provided by GPS receiver 32 are reduced in resolution to arrive at a "cell" coordinate, which indicates that the current location of the receiver is within a relatively large (e.g., ⅛ or ¼ mile square) block of space on the Earth's surface. This approach reduces the storage requirements for information stored by the radar detector to a manageable level. The sizes of the cells can be variably adjusted based upon the available memory and the desired precision. In the present example, 128 bits are allocated to storing cell coordinates, so the cell coordinates can only have as much precision as can be provided in 128 bits a cell, e.g., by discarding the least significant bits of the coordinates. In other applications, different bit sizes and resolutions could be utilized. It will also be noted that the storage requirements can be reduced by designing the receiver for operation only in a specified part of the Earth, e.g., only in Europe, Japan or North America. By so doing, part of the coordinates for a cell will not need to be stored because they will be the same for all stored cells. In such an embodiment, whenever the coordinates provided by the GPS receiver fall outside of the pre-established region, the receiver will either disable all storage of information (if approved via operational input from the user), or establish a new region of interest and discard all data from previously identified regions. Alternatively, the operator may set the device in either a "precision" (high coordinate resolution) or "wide area" (low coordinate resolution) mode, based upon the driving habits of the driver. In "wide area" mode, the reduced resolution used for each cell coordinate permits a greater number of coordinates to be stored, albeit with reduced precision as to each coordinate. Rural drivers and others that often follow common paths, would be best suited to "precision" mode, whereas urban drivers would be better suited to "wide area" mode. As a further alternative, the detector may automatically select a mode based upon the memory consumption or the time lapse before the memory of the detector becomes full; if the memory fills rapidly, the unit would automatically switch to a "wide area" mode using low precision coordinates, whereas if the memory never fills or fills only slowly, the unit will remain in its "precision" mode.

The date and time information in field 56 is useful when selecting least recently used (oldest) entries in storage for replacement, as is described further below.

Fields 58, 60 and 62 store source incidence counters, one for each of a plurality of frequency blocks. Field 58 stores counter(s) for block(s) in the X band. Field 60 stores counter(s) for block(s) in the K band. Field 62 stores counter(s) for block(s) in the Ka band. The number of blocks in each band can vary in different embodiments of the present disclosure, and is a function of the signal frequency content details provided by the detector 24 and DSP 26. As one example, the X, K and Ka bands are divided into a total of 32 frequency blocks. Each block is provided a 4-bit counter in fields 58, 60 and 62. The counters have a minimum value of 0 and a maximum value of 15 and are a measure of the number of times a signal in the associated frequency block has been detected at that location. As will be described below in greater detail, the "source incidence" counters are used in identifying geographic locations that appear to have spurious sources of police radar signals, due to repeated detection of such signals without confirmation of police activity.

In the data structures shown in FIG. 3, to save space, main entries 52 are interleaved with a greater number of differential entries 64, each of which stores information for a cell. A first field in a differential entry 64 is an index pointer 66 to a main entry 52, e.g. an index to a storage location at which the main entry is stored. A second field is a differential field 68 that identifies the difference between the coordinate of the differential entry 64 and the coordinate stored in the main entry 52. The index and differential can be stored in substantially fewer than 128 bits, so that a differential entry 64 is substantially smaller than a main entry, thus saving storage space. Differential entries further include a date and time field 56 and fields 58, 60 and 62 for storing counters for X, K or Ka frequencies, as described above.

FIG. 4 illustrates data structures 70 used to store vehicle motion history records or trip records in EEPROM 34. These data structures include main entries 72 which include field 74 storing a 128 bit cell coordinate, followed by a speed field 76 which can be, for example, 7 bits in length.

Differential entries 78 associated with each main entry include a differential coordinate field 80 indicating the difference in the cell coordinate from the associated main entry 72, and a speed field 76 indicating a speed recorded at the cell. Because motion history records or trip records are stored sequentially during motion of the detector, differential entries 78 are stored after and adjacent to the associated main entry 72. Accordingly, differential entries 78 do not require an index field to associate the differential entry 78 with a main entry 72, because the association is implied from the location of the differential entry 78 in memory after its associated main entry 72.

History entries may be used for a number of purposes. For example, in the following description, history entries are accessed as part of defining an "everyday route" taken by the detector at the operator's identification. History entries may also be used for driver monitoring; they may be downloaded to a host PC via USB interface 46, and evaluated to determine whether the vehicle has taken abrupt turns, show excessive speed, or entered undesired locations, all of which may be useful in monitoring the activity, e.g., of teenage drivers. History entries may also be uploaded to PC to provide evidence of the driving history of the vehicle before and at the time of a police citation for speeding. If a driver has been unfairly cited for speeding, history records from the detector can provide compelling evidence to court that the citation is in error. For the purpose of enabling these uses, history entries stored by fusion processor 22 are encrypted when stored and cannot be modified by fusion processor 22 or any PC software supplied for viewing those entries.

FIG. 5 illustrates data structures 82 that can be used to store hazard information and other flag bits related to cells. These data structures 82 include main entries 84 which include a full 128 bit cell coordinate in field 88, followed by a date and time field 90 and flag bits 92 indicating the hazard or condition associated with the identified location. The differential entries 86 include an index field 94 pointing to one of the main entries, a differential coordinate field 96 indicating the difference in the cell coordinate from the associated main entry 84, a date and time field 98, and a set of flag bits 92 indicating the hazard or condition associated with the identified location. The flag bits may identify various hazard conditions. For example, in the specific embodiment described below, there is an "always warn" flag bit that indicates that police activity has previously been confirmed at the location, and therefore the user should be warned of all apparent police radar signals at the location. Further, there is a "location lockout" flag that indicates that broadband sources of spurious police radar signals have been experienced at the location, and therefore in the future warnings of police radar signals should be suppressed at the location. Similarly, a "minimal visual lockout" flag indicates that, due to the unwanted distraction of spurious police radar warnings at a location, only a minimal visual warning should be made of police radar signals identified at the location. The flag bits further include "frequency lockout" bits, one for each frequency block identified by the radar receiver. These bits identify frequencies at the location in which spurious police radar signals have previously been encountered, so that in the future apparent police radar signals at the same frequencies are ignored. The flag bits may also include additional flags to warn of other conditions, such as that there was construction at the identified location, or that some other cause for traffic slowdowns were seen at the identified location, to aid in vehicle navigation.

The information contained in the databases of FIGS. 3 and 5 may be assimilated by the detector through operation, as is described below. Alternatively, this information may be pre-installed in the detector, e.g. via an upload from a host PC via the USB port 46. There would be substantial benefits to pre-training a detector in this way for a particular geographic area. By pre-training the detector, the driver would not have to endure the audible alerts that would naturally occur before it is trained for each source of spurious police radar signals. In a given area, the ideal training profile would not vary much from one detector to the next, since all detectors should reject the same sources in the same areas. As a result, there are few issues that would have to be resolved in order to transfer training information from one radar detector.

The Internet provides a convenient means for storing and accessing repositories of information. Web sites will be established and devoted to this task. They will provide several convenient types of training information. One will be a training file containing the coordinate information from an online "Speed Trap Registry" e.g., at the internet site such as Cobra.com or EscortRadar.com, or an application such as Drive Smarter®. This information would be usable to set "always warn" bits at the locales of known speed traps. A second type of training information would be training files submitted by individuals for use in particular areas, and the third type of information would be aggregate training files created by integrating individually-submitted information into single files organized by region. Aggregate training files would be managed and updated by the web site administrator.

Training files would have low value if they could not be readily used by other detectors. The transferability of training files from one detector to another will depend on the differences in how real world signals are perceived by their embedded processors. In large part, these differences are a direct result of manufacturing and component variations. During the manufacturing process, a detector goes through a set of calibration steps in order to guarantee that the unit meets specifications for Spectral Band Coverage and Sensitivity. These calibration steps reduce the cost of designing the product since lower cost, poorer tolerance components can be used on the assumption that a final manufacturing calibration procedure will eventually compensate for the lower tolerance. Once calibrated, an acceptable product must also be able to perform over a predefined temperature range.

Component tolerance, manufacturing calibration, and operating temperature are key factors that determine how the spectrum of microwave signals are 'viewed' by the embedded Microprocessor or DSP. Radar products convert the spectral band such as X-Band into an array of values that are proportional to the signal energy in consecutive slots or bins of the spectrum. In order for the product to be 'in tolerance' these slot positions must be adjusted so they precisely cover the full range of X, K, and the Ka bands.

The calibration procedure is only concerned with guaranteeing that the slots provide adequate coverage of each band. It is less concerned as to whether any one of these slots falls on a precise physical frequency. Therefore the first frequency block in one detector will not necessary be perceived at the same frequency as the first slot in another detector.

If training data is to be shared between various detectors, it will be necessary for supporting software to compensate for these variations. When new pre-trained data is supplied, the detector will undergo an authentication procedure in order to determine the relationships between the pre-train data and its own receiver configuration. This will be based on comparing the frequencies of newly encountered sources to those of the pre-train data at matching coordinates. By comparing the observed frequencies to those in the training set, a "correction profile" will be constructed, that represents the change between the pre-train data and the output of the local microwave receiver. At the end of the authentication procedure, the entire pre-training file will be incorporated into the active train data. During the authentication procedure, the user will be exposed to unconditioned detector responses. This authentication procedure will be substantially shorter than the training period of a virgin detector. Once authentication is complete, the user will receive a notification indicating that the product is switching from authentication over to normal operation. If the training mode is engaged, the authenticated data will continue to be massaged by new driving encounters, as detailed below.

Figure 6A:
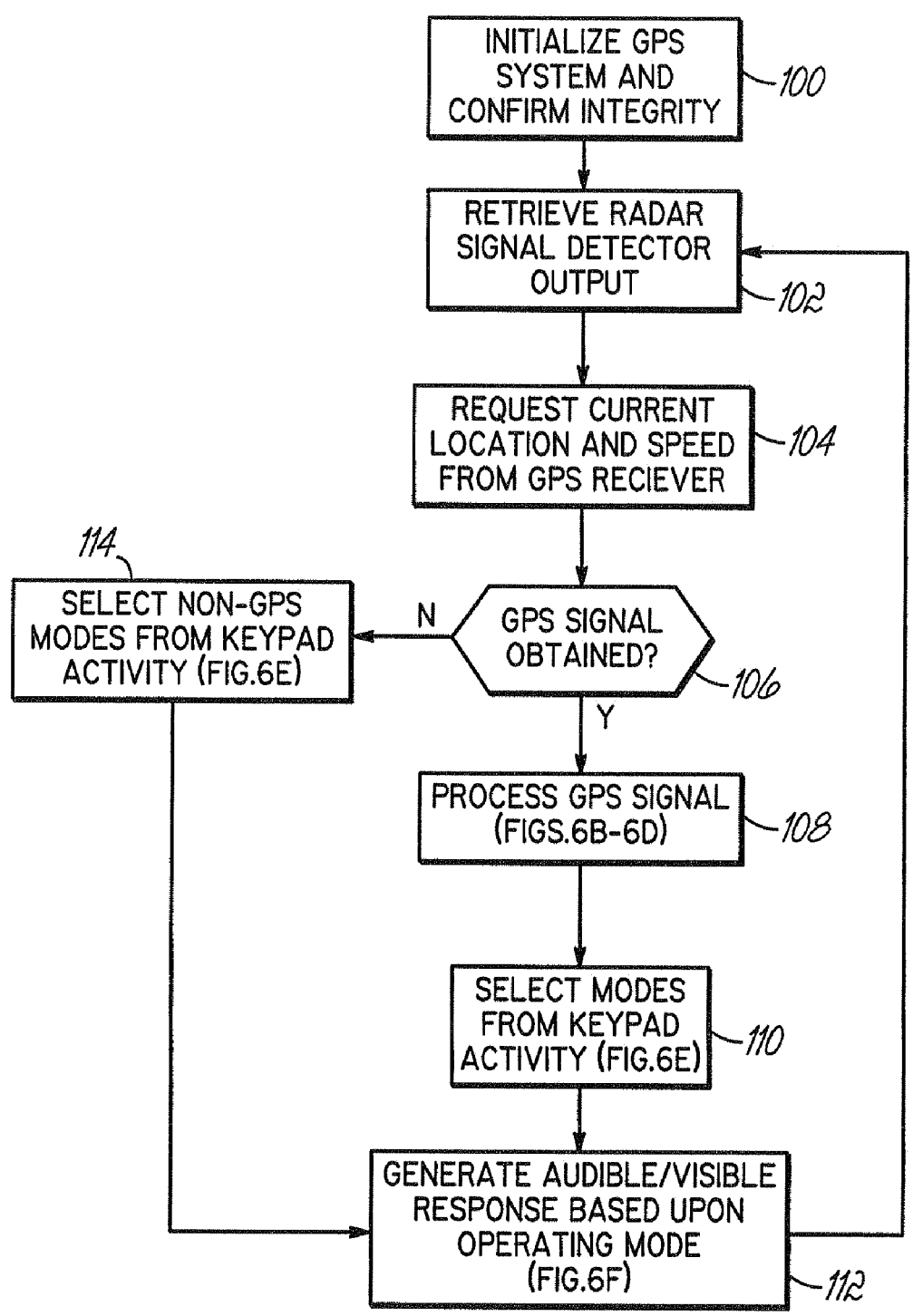
FIG. 6A is a flow chart of the operations of the CPU of the radar detector of FIG. 2, carrying out principles of the present disclosure.

Referring now to FIG. 6A, operations of the fusion processor 22 to carry out principles of the present disclosure can be described in greater detail. Fusion processor 22 performs a main loop of steps during regular operation of GPS enabled radar detection. This main loop of steps is illustrated in FIG. 6A and is detailed in FIGS. 6B through 6F, as well as FIG. 9.

When fusion processor 22 is initialized, i.e., when power to the GPS enabled radar detector is turned on, the device is initialized in step 100. This initialization step includes performing diagnostic checks on the various circuitry illustrated in FIG. 2 to insure its proper operation, as well as initialization of the GPS receiver 32 to insure GPS signals can be received accurately by fusion processor 22. In addition, various internal variables, such as a variable for identifying a current position, are initialized. The initial values are chosen to insure proper operation; for example, the current position variable is initialized to a value that will cause the first pass through the main loop FIG. 6A to include processing of a current location in steps 110 and 112 in accordance with FIGS. 6B-6E, as discussed below.

The first step in the main loop performed by fusion processor 22, is step 102, in which radar detection circuitry 24 and 26 is accessed to obtain information on police radar signals currently being received by the GPS enabled radar detector. In a subsequent step 104, fusion processor 22 communicates with GPS receiver 32 to request a current location and a current vehicle speed from the GPS receiver 32. This information can then be utilized in performing GPS related operations described in the following steps. As noted above, vehicle speed may also be obtained from the vehicle itself via an OBDII interface 44 if the vehicle in which the GPS enabled radar detector is installed has a suitable OBD connector for delivering vehicle speed information. It will be appreciated further that vehicle location information might also be obtained via an OBDII connector from a GPS receiver that may be built into the vehicle within which the GPS enabled radar detector is installed. When the vehicle in which the GPS enabled radar detector is installed has both vehicle speed and vehicle position information available via an OBDII connector, the GPS receiver 32 may not be used at all, or may not even be included in the GPS enabled radar detector, to facilitate cost reduction for the GPS enabled radar detector.

Following steps 102 and 104 in which current police radar and GPS related information is obtained, different actions are taken based upon whether GPS information is available. Specifically, in step 106 it is determined whether a GPS signal has been received. If a GPS signal is available, then all GPS enhanced functions of the radar detector may be performed. If no GPS signal has been received, then the radar detector will revert to processing police radar signals in a manner analogous to conventional non-GPS enabled radar detectors.

Assuming for the moment that a GPS signal is available in step 106, and therefore a current position for the vehicle is known, then in step 108 a sequence of steps is performed to process the GPS signal, as is further detailed below with reference to FIGS. 6B, 6C and 6D. This processing can include retrieval and/or updating of stored police radar information and the signal information database illustrated in FIG. 3, the vehicle history database illustrated in FIG. 4, and/or the flag database illustrated in FIG. 5.

After processing the GPS signal, in step 110 keypad activity on keypad 36 is detected and processed to alter operating modes of the GPS enabled radar detector, as described below in further detail with reference to FIG. 6E. The operative modes controllable through the keypad may include:

a "warning suppression" mode in which warnings, particularly audible warnings, produced by the GPS enabled radar detector are suppressed so that they are not disturbing to the operator of the vehicle.

an "expert meter" mode in which detailed information regarding received warning signals are displayed on display 38 of the GPS enabled radar detector, as described in U.S. Pat. No. 5,668,554, which is hereby incorporated by reference in its entirety.

a "data overwrite" mode in which the GPS enabled radar detector saves, into the signal information database of FIG. 3, data regarding any location not previously stored in the database, even when this signal information database is full, by overwriting the oldest data in the signal information database when necessary. When the "data overwrite" mode is disabled, then the signal information database will not be overwritten once it becomes full.

a "frequency lockout" mode, in which police radar frequencies detected by the receiver are taken to be from non-police sources, and appropriate flags are set in the flag database illustrated in FIG. 5. The "frequency lockout" mode is engaged by the vehicle operator when non-police radar signals are being received and the operator wishes to suppress future warning signals caused by the same sources at the same geographic locations. As noted below, "frequency lockout" mode can only be engaged while the GPS enabled radar detector is detecting an apparent police radar signal and will be automatically disengaged when this signal is no longer being received.

an "adjusted sensitivity" mode in which, for a given frequency band known to contain spurious police radar signals, police radar frequencies in the given band detected by the receiver are taken to be from non-police sources if they fail to meet an adjusted sensitivity of the radar detector, and appropriate flags are adjusted in the flag database illustrated in FIG. 5.

an "automatic sensitivity-adjusting" mode in which, for a given frequency band known to contain spurious police radar signals, police radar frequencies in the given band detected by the receiver are taken to be from non-police sources if they fail to meet an adjusted sensitivity of the radar detector, the sensitivity of the radar detector being continuously variable based on the position of the radar detector, with appropriate flags being adjusted in the flag database illustrated in FIG. 5.

an "incremental sensitivity-adjusting" mode in which, for a given frequency band known to contain spurious police radar signals, police radar frequencies in the given band detected by the receiver are taken to be from non-police sources if they fail to meet an adjusted sensitivity of the radar detector and wherein this adjusted sensitivity is incrementally adjusted as the radar detector moves traverses a geofence boundary, and appropriate flags are adjusted in the flag database illustrated in FIG. 5.a "location lockout" mode, in which the flag database of FIG. 5 is updated to suppress all audible warnings of radar signals at the current location of the vehicle. As is the case with the "frequency lockout" mode, the "location lockout" mode will be enabled by a vehicle operator when the vehicle is near to a known source of spurious police radar signals of a broadband character. The "location lockout" mode can only be engaged while the GPS enabled radar detector is detecting an apparent police radar signal, and will be automatically disengaged whenever a police radar signal is no longer being received from the GPS enabled radar detector.

a "minimal visual lockout" mode, in which the flag database of FIG. 5 is updated to suppress most or all visual warnings of radar signals at the current location of the vehicle. The "location lockout" mode will be enabled by a vehicle operator when the vehicle is near to a known source of spurious police radar signals of a broadband character, and at that location does not wish to be disturbed by even a visual radar signal warning. The "location lockout" mode can only be engaged while the GPS enabled radar detector is detecting an apparent police radar signal, and will be automatically disengaged whenever a police radar signal is no longer being received from the GPS enabled radar detector.

a "police confirmation" mode, in which flags in the flag database of FIG. 5 will be set to insure a warning signal is always delivered for any police radar signal received at the current vehicle location. The "police confirmation" mode will be activated by a vehicle operator upon sighting a police stakeout.

a "training" mode, in which the GPS enabled radar detector will store signal information for all geographic locations that the GPS enabled radar detector reaches or passes during operation. When "training" mode is disabled, the signal incidence counters found in the signal information database of FIG. 3, will not be modified by the GPS enabled radar detector during its normal operation.

a "route identification" mode in which the route currently traveled by the vehicle is memorized by the GPS enabled radar detector to be subsequently referenced in performing radar detection. Using "route identification" mode, a user may establish one or more everyday routes traveled by the vehicle, and cause the GPS enabled radar detector to continuously update its signal incidence information in the signal information database of FIG. 3 whenever one of these routes are traversed. Routes are identified by an operator by entering the "route identification" mode at the beginning a route, and then exiting the "route identification" at the end of the route.

After selecting appropriate modes based upon keypad activity or the like, in step 112, an appropriate audible or visible response is produced by the GPS enabled radar detector based upon its current operating mode and the presence or absence of radar detector signal received in step 102. Details of this operation are described below with reference to FIG. 6F. Additionally, other modes besides the modes described above may be implemented and/or the modes may have varying processes of implementation (e.g., a user is not required to press buttons or take any action, or a manual process for a lockout may be to hit a mute three times on the device). After step 112, processing returns to step 102 to obtain a new radar detector signal output and a new current location and speed and then perform additional analysis of that data as described above.

As noted above, in some circumstances a GPS signal will not be available during operation of the GPS enabled radar detector. In this case, processing continues from step 106 to step 114 in which any non-GPS related operational modes may be activated based upon the activity at keypad 35. GPS enabled modes are unavailable so long as no GPS signal has been obtained, so the processing in step 114 eliminates those modes which cannot be activated in the absence of a GPS signal. After step 114, processing continues to step 112 in which an appropriate audible or visible response is generated based upon the current operating mode and the radar detected signal received in step 102.

Figure 6B:
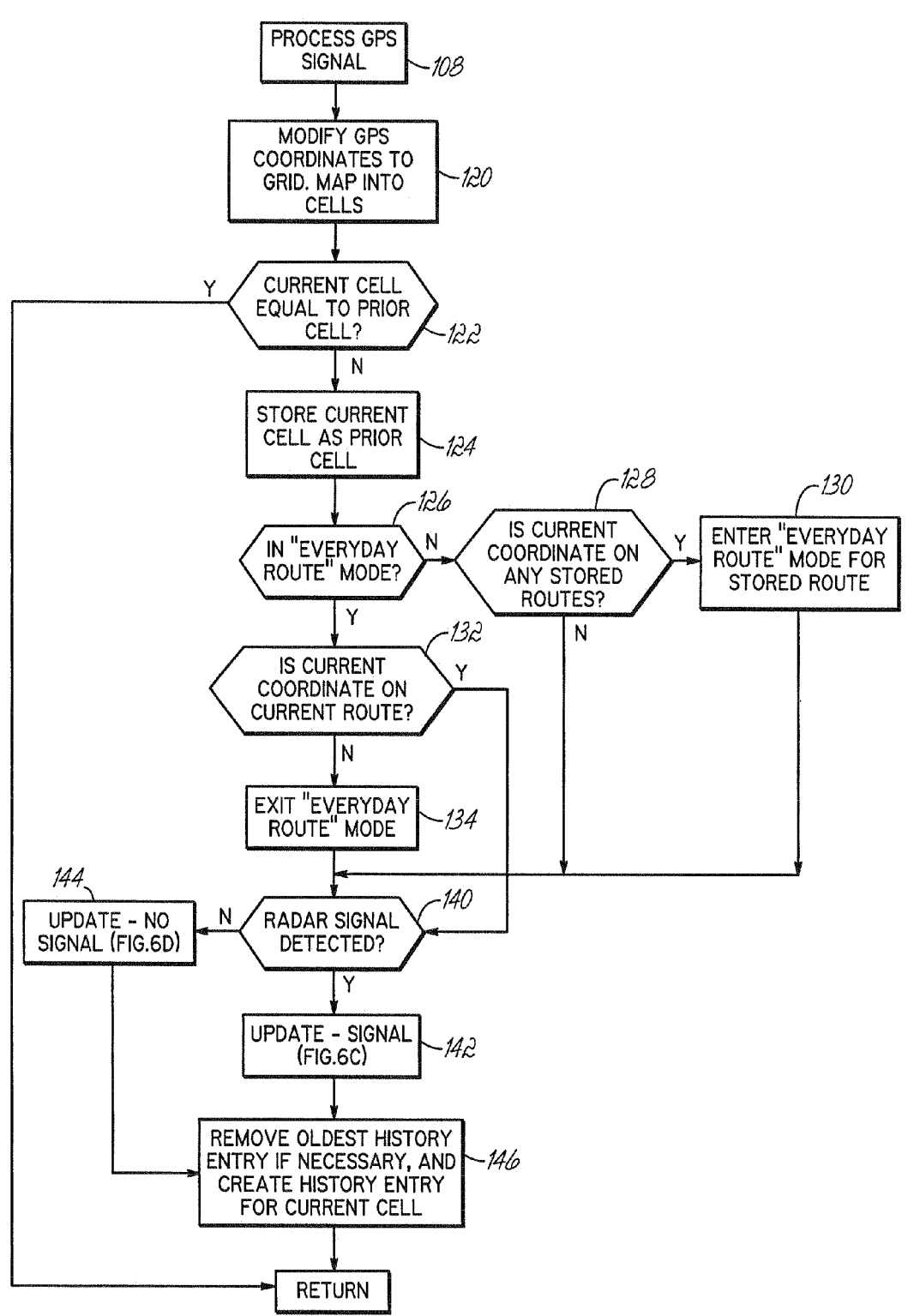
FIG. 6B is a flow chart of operations of the CPU of FIG. 2 in processing GPS information when GPS signals are being received.

Referring now to FIG. 6B, the processing performed on a GPS signal in step 108 of FIG. 6A can be described in greater detail. As a first step 120, GPS coordinates received from the GPS receiver 32 are modified by reducing their accuracy. This process is known as "gridding" the coordinates and involves truncating that part of the coordinate of greater accuracy than the defined grid. As a consequence of this modification, the GPS coordinate is mapped into a cell number; every location on the globe falls within a cell of the grid, and has a particular cell number derived from the most significant bits of the GPS coordinates measured within the cell. Cells may be relatively small, i.e., one-eighth of a mile square, or may be relatively large, i.e., one mile square.

After a current cell number is generated from GPS coordinates, then actions are taken based upon whether the vehicle is transitioning from one cell to another, and further based upon current operational modes of the GPS enabled radar detector. In the first of these steps 122, it is determined whether the current cell obtained from the GPS receiver is the same stored prior cell obtained from the GPS receiver during the previous pass through the processing of FIG. 6B. If so, the vehicle is in the same cell as has been previously processed, and then no further processing for the current cell is required, and the process of FIG. 6B returns.

If, however, the vehicle has moved to a new cell, then in step 124, the cell number for this new current cell is stored as the prior cell, so that in subsequent passes through the process of FIG. 6B, it will be known whether or not the vehicle has moved to another cell.

After step 124, steps are taken to manage "everyday route" modes of the GPS enabled radar detector. As noted above, the user of the GPS enabled radar detector may establish one or more everyday routes traveled by the vehicle and cause the GPS enabled radar detector to, along those routes, continuously update its signal incidence information in the signal information database of FIG. 3. Accordingly, when the GPS enabled radar detector detects that it is following one of these everyday routes, then it will automatically enter its everyday route mode, and subsequently perform different processing (as further described below in connection with FIGS. 6C and 6D). As seen in FIG. 6B, each time the GPS enabled radar detector determines in step 122 that it has passed from one cell to another, then (a.) if the detector has been following an everyday route, an evaluation is made whether the GPS enabled radar detector is continuing to follow the previously defined everyday route, or (b.) if the detector has not been following an everyday route, a determination is made whether the GPS enabled radar detector has started following a previously defined everyday route.

In the first step of this process, in step 126 it is determined whether the GPS enabled radar detector is already in its "everyday route" mode. If the radar detector is not currently in its "everyday route" mode, then it is determined whether the radar detector is entering an everyday route; specifically, in step 128, it is determined whether the current cell coordinate is on any of the pre-stored everyday routes. If the current cell is on one of the everyday routes, then the GPS enabled radar detector will determine that the vehicle carrying the detector is beginning or joining one of these pre-stored routes. In such a case, in step 130 the GPS enabled radar detector will enter its "everyday route" mode for the stored route containing the current cell coordinate. If the current coordinate is not on any stored route, step 130 is bypassed.

Returning to step 126, if the GPS enabled radar detector is already in its "everyday route" mode, then it is determined whether the detector is continuing to follow this route. In this case, processing proceeds from step 126 to step 132 to determine whether the everyday route is being followed. Specifically, in step 132 it is determined whether the current coordinate is on the current everyday route. If not, then in step 134 the GPS enabled radar detector exits its "everyday route" mode, indicating that the vehicle is no longer on the previously stored everyday route. Otherwise, step 134 is bypassed, and the detector remains in its "everyday route" mode.

Following step 134 or immediately following step 130, additional steps are performed to determine whether and how to update previously stored signal incidence information in the signal information database of FIG. 3. Processing also proceeds to step 140 from steps 132 or directly from step 128 based upon conditions described above.

In step 140 it is determined whether a radar signal is being received by the GPS enabled radar detector. If so, then in step 142 the procedure described below with reference to FIG. 6C is performed to update, as needed, the signal information database of FIG. 3. If no radar signal is being currently detected, then in step 144 the process described below with reference to FIG. 6D is performed to update, as needed, the signal information database of FIG. 3. After step 142 or 144, in step 146 the history database of FIG. 4 is updated by removing the oldest history entry from that database (if necessary to make room), and creating a new history entry for the current cell. The new history entry will include the cell coordinate or a differential coordinate as discussed above with reference to FIG. 4, and would also include a vehicle speed as obtained in step 104 from the GPS receiver or alternatively from an OBD II interface to the vehicle. Following step 146, the processing of the GPS signal is complete.

Figure 6C:
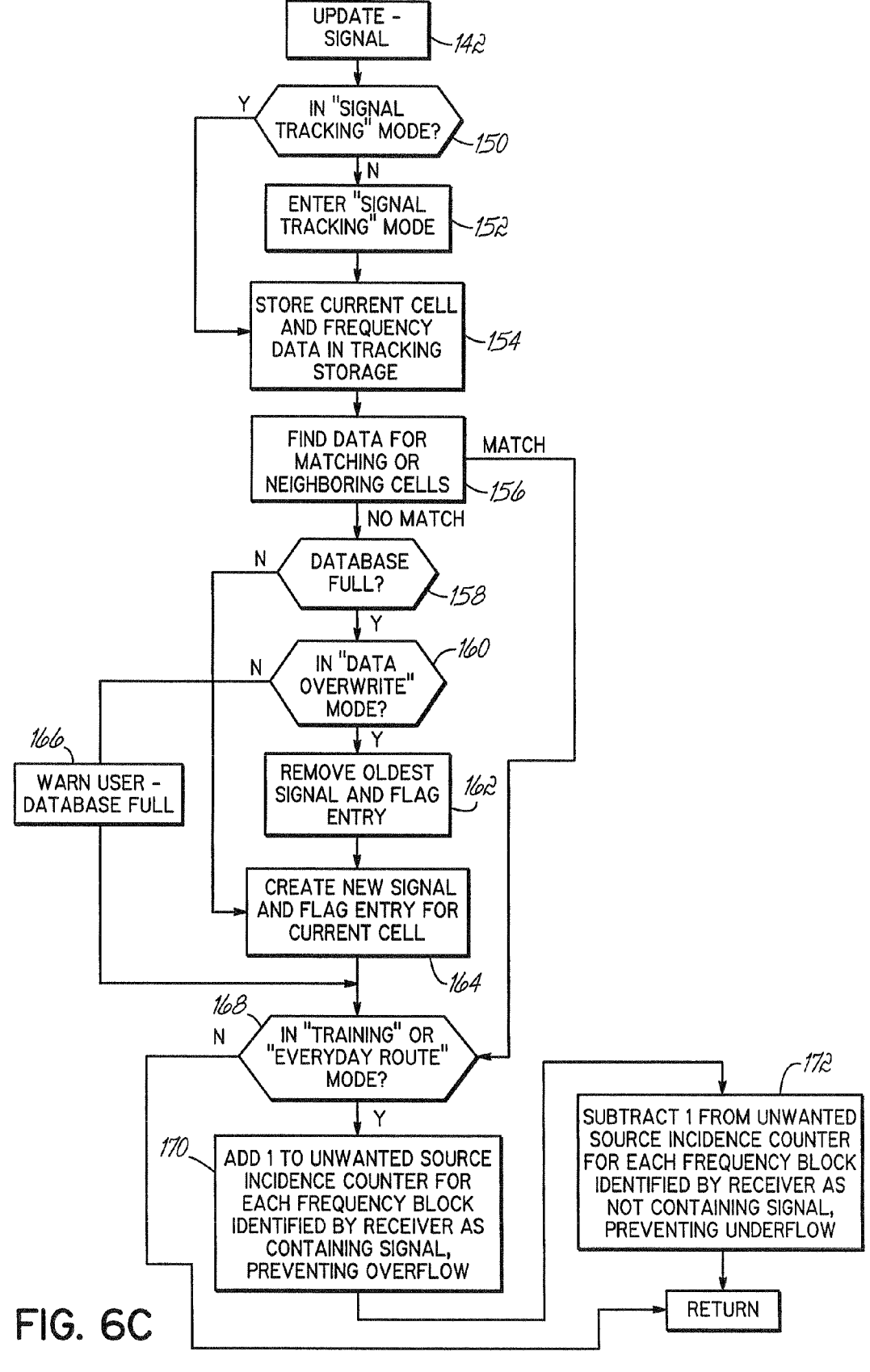
FIG. 6C is a flow chart of operations of the CPU of FIG. 2 in updating stored information when a radar signal is being received.

Referring to FIG. 6C, updating of the signal information database of FIG. 3 in the presence of a police radar signal can be elaborated. In the first step 150 it is determined whether the GPS enabled radar detector is in its "signal tracking" mode. The "signal tracking" mode is entered whenever the GPS enabled radar detector is receiving an apparent police radar signal as the detector is passing through space. So long as an apparent police radar signal is being continuously detected, the detector will remain in signal tracking mode in order to associate that police radar signal with all of the geographic locations in which it was detected. It will be appreciated that the process of FIG. 6C will not commence unless there is a police radar signal being detected; therefore, the first step 150 is to determine whether the detector is in its signal tracking mode, and if not, in step 152 to enter the signal tracking mode to thereby begin tracking the police radar signal that had not previously been detected.

After step 152 or after step 150 if the detector is already in its signal tracking mode, in step 154 the current cell coordinate and the frequency data for the current cell are stored in a special tracking storage area accessible to fusion processor 22 in EEPROM 34. The frequency data and cell information stored in this tracking storage can be used subsequently to identify the source of the tracked police radar signal more accurately.

After step 154, different actions are taken based upon whether the signal information database of FIG. 3 already contains signal information for the detector's current cell coordinate. If there are no matching cells in the signal information database of FIG. 3, then processing continues to step 158 in which it is determined whether the signal information database of FIG. 3 is full, i.e., all the storage space allocated to this database in EEPROM 34 has been consumed. If all the space has been consumed, then in step 160 it is determined whether the GPS enabled radar detector is in its "data overwrite" mode. If so, then the user has identified that current information should be stored for each cell encountered by the vehicle, even when doing so requires the elimination of older stored data. Accordingly, in data overwrite mode, processing proceeds from step 160 to step 162 in which the oldest signal and flag entries in the databases of FIGS. 3 and 5 are removed, and then to step 164 in which new signal and flag entries are created for the current cell so that signal information and flag information can be stored. If, however, the detector is not in its "data overwrite" mode in step 160, then a warning is delivered to the user that storage of information is being prevented due to the database being full (step 166).

After step 166 or 164, or immediately after step 156 if there is already data stored for the current cell, in step 168 it is determined whether the GPS enabled radar detector is in its "training" or "everyday route" mode. As noted above, in these modes, signal information stored in the database of FIG. 3 is continuously updated each time a cell is encountered. Accordingly, if the detector is in either its "training" or "everyday route" mode, then in step 170 the unwanted source incidence counter for each frequency block identified by the radar receiver 24 as containing signal, is incremented, preventing an overflow. Subsequently, in step 172 the unwanted source incidence counter for each frequency block identified by the radar receiver 24 as not having signal, is decremented, preventing an underflow. This thus updates the source incidence counters for each frequency block for the current cell. After this processing, or immediately after step 168 if the GPS enabled radar detector is not in the "training" or "everyday route" mode, updating in step 142 is complete.

Figure 6D:
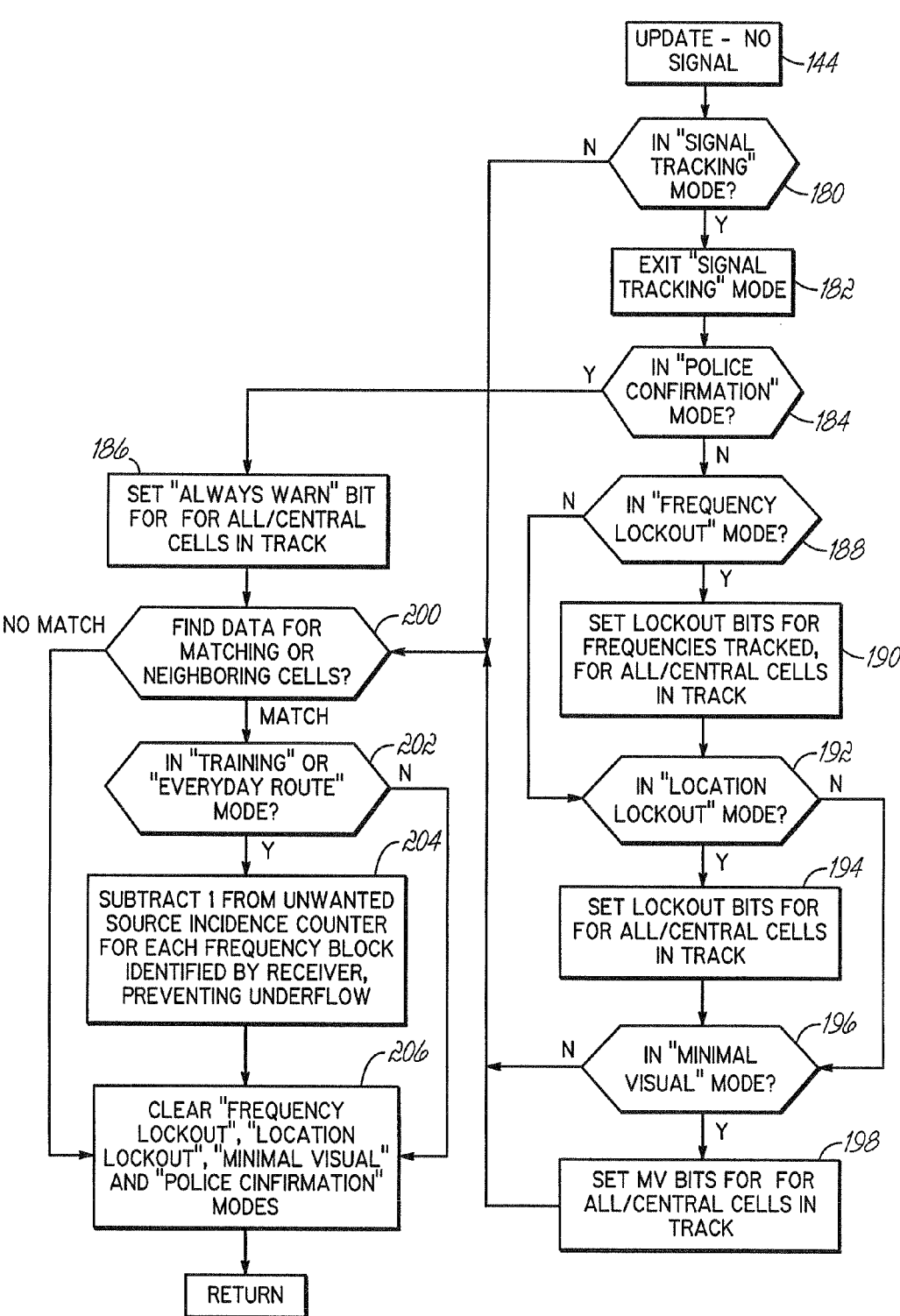
FIG. 6D is a flow chart of operations of the CPU of FIG. 2 in updating stored information when a radar signal is not being received.

Referring now to FIG. 6D, processing in step 144, to update various databases when no signal is detected, can be explained. As will be elaborated below, when no police radar signal is being received by the GPS enabled radar detector, this indicates that many of the modes described above for tracking and identifying sources of police radar signal should be terminated.

Specifically, in step 180 it is determined whether the GPS enabled radar detector is in "signal tracking" mode. As discussed above, the "signal tracking" mode signifies that the GPS enabled radar detector is currently tracking the cell locations and frequencies of an apparent police radar signal detected by the GPS enabled radar detector. As discussed above with reference to FIG. 6C, step 152, the GPS enabled radar detector will enter "signal tracking" whenever an apparent police radar signal is received. So long as the signal is continuously received, processing of the GPS signal will pass through step 140 of FIG. 6B to FIG. 6C, and "signal tracking" mode will remain engaged. If, however, no police radar signal is being received when processing of the GPS signal passes through step 140 of FIG. 6B, then processing will pass to FIG. 6D and thus to step 180 of FIG. 6D. In the first pass through FIG. 6B after a police radar signal has faded, e.g., due to motion of the vehicle past the source of that signal, "signal tracking" mode will still be engaged as a consequence of prior passes through FIGS. 6B and 6C. Thus, in step 180 of FIG. 6D, if "signal tracking" mode is engaged, but no police radar signal is currently being received, this indicates that the previously detected signal has just faded. In such a situation, a complete record has been made of the locations in which the source was received by the GPS enabled radar detector. This record can be used to characterize the source as to location and frequency, by analyzing the cells in which the signal was tracked, and the frequencies in which the signal was tracked. Thus, if in step 144, the GPS enabled radar detector is in "signal tracking" mode, in step 182 the detector exits its "signal tracking" mode. Subsequently, steps are taken to store relevant information collected for the tracked signal.

In a first step 184, it is determined whether the GPS enabled radar detector is in "police confirmation" mode. If so, then the vehicle operator has pressed a key on the keypad of the GPS enabled radar detector indicating that a police stakeout was sighted, during the tracking of apparent police radar signals. In such a case, in step 186 the "always warn" flag bit is set for all or the centralmost cells in the tracked sequence of cells identified while in "signal tracking" mode. In another example, a vehicle operator may use an application (e.g., Drive Smarter®) to indicate a police stakeout was sighted. Thus, the likely locations of the source of the tracked signal are identified and the flag bits are set so that any apparent police radar signal found in those cells will always cause the user to be warned of police radar.

If the GPS enabled radar detector is not in "police confirmation" mode, in step 188 it is determined whether the GPS enabled radar detector is in "frequency lockout" mode. As described above, the detector will be in "frequency lockout" mode if the vehicle operator has used the keypad to indicate that any apparent police radar signals that were tracked in the preceding and current cell, are from spurious sources, and that the frequencies in which those spurious signals appeared should be ignored in subsequent passes through the same cell location. Accordingly, if the detector is in "frequency lockout" mode in step 188, processing continues to step 190 in which the lockout bits, in the flag bits 92, are set for all or central cells of the tracked path taken by the vehicle, for those frequencies that were identified during the "signal tracking" mode.

After step 190, or immediately after step 188 if the detector is not in "frequency lockout" mode, it is determined whether the receiver is in "location lockout" mode in step 192. It is noted above, "location lockout" mode is engaged by the vehicle operator when broadband sources of spurious produced radar signals are experienced at a geographic location, and the operator wishes to lockout all frequencies at that location. In such a case, in step 194 all of the frequency lockout bits for all or the centralmost cells in the tracked path of the vehicle are set.

After step 194, or immediately after step 192 if the detector is not in "location lockout" mode, in step 196 it is determined whether the detector is in "minimal visual" mode. As noted below, the detector will be placed in "minimal visual" mode by the operator when the operator wishes to minimize the indications of police radar signals produced when passing through a geographic region. In such a case, processing continues from step 196 to step 198 in which a minimal visual (MV) flag bit is set in the flag database of FIG. 5 for all or the centralmost cells in the tracked path of the vehicle.

After step 198, or immediately after step 196 if the detector is not in "minimal visual" mode, or immediately after step 186 if the GPS enabled radar detector is in "police confirmation" mode, in step 200 it is determined whether the signal information database of FIG. 3 includes data for matching or neighboring cells to those cells in the tracked path of the vehicle. If such a match is found, then in step 202 it is determined whether the detector is in its "training" or "everyday route" mode. If so, then the detector should update the stored signal information for the current cell. Specifically, to update signal information, in step 204 all of the unwanted source incidence counters for frequency blocks identified by the receiver are decremented, preventing underflow.

Following step 204, or immediately following step 200 if there is no matching signal information or step 202 if the detector is not in its "training" or "everyday route" mode, in step 206 the "frequency lockout", "location lockout", "minimal visual" and "police confirmation" modes are cleared, because the tracking of a police radar signal has ended, and these modes are therefore no longer relevant to the current location of the vehicle.

Figure 6E:
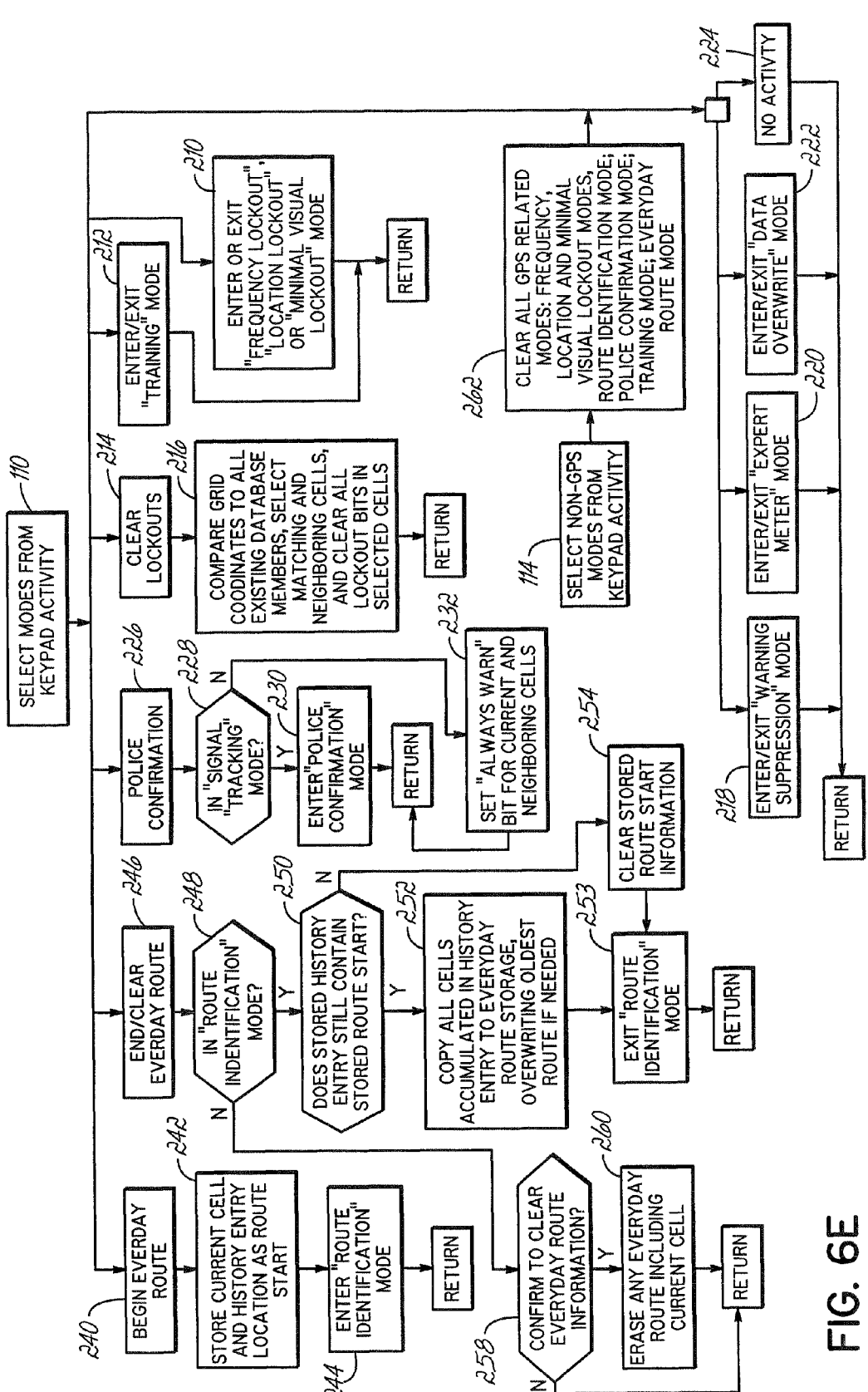
FIG. 6E is a flow chart of operations of the CPU of FIG. 2 in responding to keypad activity to change operative mode of the GPS enabled radar detector.

Referring now to FIG. 6E, the processing of keypad activity to enter and exit the various modes described throughout can be explained. As noted with reference to FIG. 6A, various modes are available only if a GPS signal has been obtained from the GPS receiver. If a GPS signal has been obtained then modes are selected from the keypad beginning at step 110. If a GPS signal has not been obtained then modes are selected from the keypad beginning at step 114, and a substantial number of modes are disabled and cannot be selected in this circumstance.

The keypad activity to select and deselect a mode may vary based upon the application and style of the GPS enabled radar detector. The display and keypad 38 and 36 may interact to produce a menu system for selecting particular modes and displaying associated information. Alternatively, individual keys of keypad 36 may be utilized to directly activate certain modes. Furthermore, display 38 may include icons or other indicators to identify currently activated modes.

A first collection of modes that may be activated via the keypad 36, are the "frequency lockout", "location lockout", and "minimal visual lockout" modes. Through interactions with the keypad in step 210, the user may initiate or terminate these modes. As described above, when initiated, these modes cause lockout information to be stored into flags of the flag database of FIG. 5 upon termination of tracking an apparent police radar signal. If these modes are not engaged at the time that the police radar signal fades from reception, then no action will be taken to set lockout bits in the flag database of FIG. 5. This approach permits a vehicle operator to initiate a lockout mode and then cancel the lockout mode, for example if the operator initially believes a radar signal to be spurious, but then determines that it is in fact being generated by a police source. It will also be noted that, by the operations of FIG. 6D, the "police confirmation" mode will override the "lockout" modes, in that if the "police confirmation" mode is engaged when a police radar signal fades from reception, any "lockout" modes that are engaged will be ignored. The user is not, however, prevented from engaging both modes simultaneously. For example, the user may receive a signal believed to be spurious, and engage a "lockout" mode. The user may then sight a police vehicle and, believing the signal is not spurious, engage "police confirmation" mode. The user may later, however, confirm that the police vehicle is not engaged in a speed trap, and consequently disengage "police confirmation" mode. If the received signal then fades from view, the "lockout" mode will be active and accordingly lockout bits will be set as described above with reference to FIG. 6D. Additional modes are described below with reference to FIG. 9.

In step 212 the vehicle operator may enter or exit the "training mode", which as described above causes the GPS enabled radar detector to collect signal information for all cells that the vehicle traverses.

A third activity that may be undertaken with the keypad, in step 214, is to request to clear all lockouts for the current vehicle location. This step may be taken where the GPS enabled radar detector has previously been programmed to lockout a frequency or location and subsequently the vehicle operator sights a police source at that location, and wishes to terminate the lockout at that location. When the vehicle operator requests to clear all existing lockouts, in step 216 the grid coordinates of the vehicle location are compared to all existing members of the flag database of FIG. 5, and all matching and/or neighboring cells are selected and all lockout bits in those cells are cleared.

The vehicle operator may also enter or exit a "warning suppression" mode in step 218, in which a warning for a currently tracked police radar signal is suppressed, i.e., so that the detector does not continue to issue warning signals for the same radar signal received. An operator may also enter or exit an "expert meter" mode in step 220, requesting that enhanced information on police radar signals received and/or GPS related lockout information or signal incidence information be displayed on display 38 of the detector. An operator may also enter a "data override" mode in step 222, thus requesting that signal information for new locations visited by the vehicle not found in the database be stored, even at the expense of overriding the oldest previously stored data of this kind. It is also possible, as shown in FIG. 6E, that there may be no keypad activity at the time that operation of the detector passes through step 110. In this circumstance, step 224, no further processing is performed.

A further action that a vehicle operator may take is to confirm a police sighting in step 226. This step causes the detector to enter "police confirmation" mode, so that the detector will ensure that police radar signals at the identified stakeout location are handled with particular urgency. Accordingly, when the user enters a police confirmation in step 226, then action is taken to set one or more "always warn" flag bits of the flag database of FIG. 5.

If at the time that the operator presses the police confirmation, no apparent police radar signal is currently being tracked, then in step 228 the receiver will not be in "signal tracking" mode. In such a circumstance, processing will continue from step 228 to step 232 in which the "always warn" flag bit is set for the current and neighboring cells of the current location of the vehicle. This step ensures that in future times when a police radar signal is detected in these locations, a warning will be delivered to the vehicle operator regardless of other conditions applicable at the time. If a signal is being tracked at the time that the vehicle operator enters a police confirmation, then a slightly different activity is undertaken. Specifically, in this case processing continues from step 228 to step 230 in which the "police confirmation" mode is entered. As noted above with respect to FIG. 6D, once the receiver is in police confirmation mode, upon termination of signal tracking, central or all cells along the tracked path of the vehicle when the police radar signal was detected, will be marked as "always warn" in the flag database of FIG. 5.

A further activity that may be undertaken by a vehicle operator is to indicate that the vehicle is at the beginning of an everyday route, in step 240. Doing so causes the GPS enabled radar detector to begin to collect information on the everyday route, for the purpose of ultimately storing a definition of an everyday route to be evaluated in connection with the processing described in connection with FIG. 6B, step 128. When the user indicates that the vehicle is at the beginning of an everyday route, in step 242 the current cell coordinate and the current entry in the vehicle history database of FIG. 4 are stored for later reference. Then in step 244 the detector enters a "route identification" mode, used later in establishing that a route has been identified and is being tracked. When the user wishes to complete an everyday route or wishes to clear everyday route processing for the current vehicle location, the user engages an end or clear operation in step 246. When this step is taken by the user, an initial determination is made in step 248 whether the detector is currently in its "route identification" mode. If so, then the user has identified the end of the everyday route that was previously identified in step 240. Thus, in step 250 it is determined whether the history entry identified and marked in step 242 continues to store the location of the route start that was stored in step 242. If so, then all of the cells accumulated in the vehicle history following the history entry identified in step 242, describe the route taken by the vehicle along the path selected by the user. In this case, all cells accumulated in the history database of FIG. 4 are copied to a special "everyday route" storage area so that all of these cells are available for analysis in connection with the processing of FIG. 6B, step 128. After storing the accumulated history entry cells, in step 252, processing is completed. After step 252, in step 253 the "route identification" mode is exited.

If in step 250, it is determined that the vehicle history database of FIG. 4 is no longer storing the start of the everyday route defined by the user, then the everyday route defined by the user was too lengthy to be processed by the GPS enabled radar detector. In such a situation, in step 254 the stored route start information is cleared and the "route identification" mode is exited.

If in step 248, the GPS enabled radar detector is not in "route identification" mode at the time that the vehicle operator requests the end of everyday route in step 246, then the vehicle operator may wish to delete any everyday route that includes or passes through the current cell. Thus, in step 258, a display is generated to the operator requesting confirmation that any everyday route including the current cell should be cleared. If a confirmation is received in step 258, then in step 260 all everyday routes including the current cell are erased from the everyday route storage of the GPS enabled radar detector. If the vehicle operator does not confirm erasure of everyday route information, then processing completes without erasing any everyday route information.

In step 114 of FIG. 6A, nonGPS modes of the GPS enabled radar detector may be activated utilizing keypad activity. This step may be taken if no GPS signal is available at some point during operation of the GPS enabled radar detector. In such a circumstance, in step 262 all GPS related modes of the GPS enabled radar detector are cleared. These include the frequency location and minimal visual lockout modes, the route identification mode, the police confirmation mode, the training mode and the everyday route mode (step 262). After clearing these modes, nonGPS related modes of the GPS enabled radar detector can be initiated. These modes include the "warning suppression" mode (step 218), the "expert meter" (step 220), and the "data override" mode (step 222). Other modes that the operator may attempt to select will be ignored so long as no GPS signal is being received.

Figure 6F:
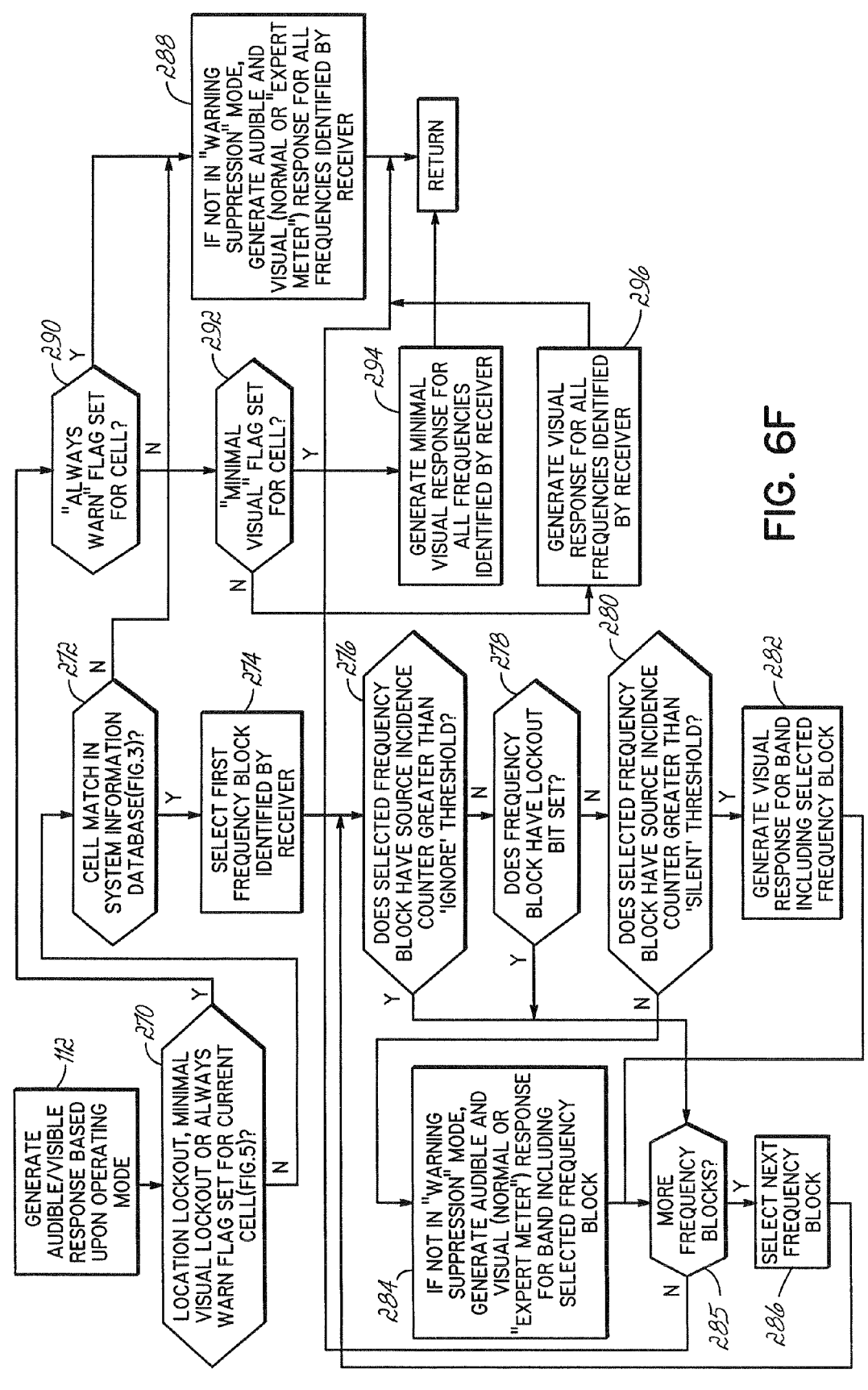
FIG. 6F is a flow chart of operations of the CPU of FIG. 2 in generating audible and visible responses based upon operating modes of the radar detector and the presence or absence of radar signals and stored information.

Referring now to FIG. 6F, operations performed in connection with generating audible and visible responses to police radar signals can be explained. In a first step 270, it is determined whether any of a number of lockout or other flags in the flag database of FIG. 5 are applicable to the current cell. In this step 270, the flag database is evaluated to see if there is an entry for the current cell, and if so whether the location lockout, minimal visual lockout or always warn flags in that entry is set. If none of these flags are set, then processing of police radar signals at the current location proceeds based upon information in the signal information database of FIG. 3, or based upon defaults if there is no previously stored information. Accordingly, if none of the flags identified in step 270 are set, then in step 272 it is determined whether there is a cell match in the signal information database of FIG. 3. If there is such a cell match, the frequencies identified by the radar receiver are compared to the signal information in the entry in the database of FIG. 3.

In the first step of this process, the first frequency block identified by the receiver is selected (step 274). Then, in step 276, it is determined whether the selected frequency block in the signal information database has a source incidence counter greater than a predetermined "ignore" threshold. If radar signals have been frequently detected in the selected frequency block, but there has never been a police sighting there (and thus the "always warn" flag has never been set), this is strongly indicative of a false source at that location. Accordingly, if the source incidence counter for a frequency block exceeds the "ignore" threshold, then any police radar signals identified in that frequency block are ignored. If, however, the selected frequency block does not have a source incidence counter greater than this threshold, then in step 278 it is determined whether the frequency block has a lockout flag bit set in the flag database of FIG. 5. Only if the frequency lockout bit for the selected frequency is not set, will processing continue to step 280. In step 280 it is determined whether the selected frequency block has a source incidence counter greater than a "silent" threshold. If the source incidence counter exceeds this threshold, then it is likely that there is a false source of radar signals at the location, and as a result in step 282 a visual-only response is generated for the frequency band including the selected frequency block. If, however, the selected frequency block does not have a source incidence counter greater than the silent threshold, then an audible and visual response can be generated. In step 284 it is determined whether the receiver is in "warning suppression" mode. If not in this mode, then an audible and visual response is generated for the band of signals including the selected frequency block. Visual response may be a normal response or may be an "expert meter" response depending upon the status of the "expert meter" mode of the receiver.

After steps 282 or 284, or immediately after steps 276 or 278 if a frequency block is to be ignored or has been locked out, in step 285 it is determined whether there are additional frequency blocks to be evaluated. If so, then in step 286 the next frequency block is selected and processing returns to step 276. After all frequency blocks have been evaluated, processing ends at step 285, and the generation of audible and visual responses is completed.

Returning to step 270, if one of the location lockout, minimal visual lockout or always warn flags are set for the current cell, then in step 290 and in step 292 it is determined which of these flags is set. If the "always warn" flag is set for the current cell, then in step 288 an audible and visual response is generated for all frequencies identified by the receiver, unless suppressed by "warning suppression mode". Step 288 is also performed following step 272 if there is no match for the current cell in the signal information database.

If the "minimal visual" flag is set for a current cell, but the "always warn" flag is not, processing proceeds from step 290 to step 292 and then to step 294 in which a minimal visual response is generated for all frequencies identified by the receiver, such as a small blinking flag on the display of the detector.

If the "always warn" and "minimal visual" flags are not set, but the "location lockout" flag is set for the current cell, then processing continues from step 270 through steps 290 and 292 to step 296, in which a visual-only response is generated for all frequencies identified by the receiver, which may include expert meter information or other details available from the detector.

After step 288, 294 or 296 processing to generate an audible and/or visual response is completed.

While the present disclosure has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art.

For example, it will be appreciated that principles of the present disclosure may also be applied to systems that do not include a GPS receiver. For example, in a simplified embodiment of the present disclosure, the radar warning receiver may automatically enter its "warning suppression"

mode based upon the speed of the vehicle. The speed of the vehicle may, of course, be obtained from a GPS receiver, but if a GPS receiver is not available and/or unnecessarily expensive to include in the receiver, the receiver could obtain vehicle speed information directly from the vehicle's on-board information processing system via the ODB II interface discussed above. A threshold speed of 15 MPH could be used as a default, with "warning suppression" mode automatically engaged at speeds below this threshold. This threshold may be user-adjustable, e.g., within a range such as 5 to 50 MPH.

The interface connector used by the receiver may take other forms than the known USB standard. It may use any computer interface standard (e.g., IEEE 488), or an automotive wiring standard, the J1854, Can, BH12 and LIN standards, or others.

In a more refined embodiment, a "everyday route" mode could be included, in which the operator can perform "everyday route velocity" training. In this "everyday route velocity" training mode, the vehicle speed at each point along the "everyday route" would be stored along with the cell locations along the route. Subsequently, when the detector determines that it is on a previously defined everyday route, it will enter "warning suppression" mode whenever the vehicle speed is within a tolerance of, or below, the velocity recorded when in "everyday route velocity" training mode. Thus, no warning signals will be generated so long as the vehicle is not traveling faster than the threshold speed identified by the operator during "everyday route velocity" training of the detector.

It will be further appreciated that the "signal tracking" mode described herein may operate upon each frequency band independently, so that the "signal tracking" mode may be engaged for one band while disengaged for others, and so that the fade-out of a tracked signal at one frequency will cause flag bits to be set for that frequency while other frequencies continue to be tracked.

It will be further appreciated that the determination of whether to generate an audible or visual response, or both, may be based on information in addition to the flags applicable to the current cell of the vehicle. For example, the flags in cells recently traversed by the vehicle may also be consulted to determine whether audible or visual signals should be suppressed at a current cell. Thus, for example, if the detector passes through a cell that has been marked for "minimal visual" lockout, warnings will be suppressed for subsequent cells entered by the vehicle while the same signal is being tracked, regardless of whether flag bits in those cells call for a lockout.

As discussed above, the processor 22 may compare the radar detector's immediate coordinates with a stored list of the coordinates of unwanted stationary sources and may also determine when the radar detector is within a geofenced area, which may enable the process 22 to avoid certain processing by the radar detector 20 as described above. Specifically, in previously existing radar detectors, false alarm reduction along routes which are frequented has seen substantial improvements over recent years. However, reduction of false alarms in new or unfamiliar areas where a radar detector device has not traveled have continued to be problematic. For example, false alarms due to stationary sources (e.g., door openers) which a radar detector passes routinely may generally have been minimized to an acceptable level using location based lockout features, while the same types of sources of signals in unfamiliar areas still prove to be problematic because the history records for the radar detector may have not yet been created.

It should be appreciated that a database may store some known problem locations (e.g., location of a known speed camera, red light camera or speed trap), which may reliably allow a cell (e.g., at specific GPS coordinates) to be identified to a user without the radar detector device having ever been present at that cell; however, the existing prior art has not provided a suitably reliable database of locations where false alarms occur outside of these known problem locations. Typically, a radar detector may only reliably suppress false alarms at a specific location after receiving either user input about that specific location (e.g., indicating false alarm, or confirming presence of a radar gun), or by historical data entries of that specific radar detector at that specific location, for example, using thresholds such as ignore threshold or silent threshold discussed above. It should be appreciated that each individual radar detector 20 may interpret the same signal (e.g., a K band signal) produced by a door opener or other false alarm source differently due to calibration during manufacturing, as discussed above, resulting in difficulty in producing a suitably reliable database of such stationary false alarm sources. For example, different radar detectors of the same model may place a particular restaurant door opener signal at a specific set of geographic coordinates into different slots or bins of spectrum in the K band. Thus, while location based history data specific to a particular radar detector 20 may not always be required, for practical purposes, creating a suitably reliable database of such sources which may be "viewed" as different sources has proven technologically difficult to create, and creating a radar detector 20 specific database of false alarms is relatively computationally cumbersome even along previously driven or routine routes, and is even more difficult or impossible for routes that were never traveled previously by that particular radar detector 20. The present disclosure provides a new and inventive process to address the above discussed challenges.

Moreover, at present, the X band and K band are frequently the source of false alarms, leading to users being desensitized to these alarms. In regularly driven routes, such as an "everyday route", the radar detector 20 uses the above discussed techniques to reliably suppress false alarms. However, in new areas where the radar detector 20 has never had any history at a given location, the user has never provided input and no historical data has been able to build up over time and be recorded to reliably suppress false alarms. Accordingly, when the radar detector 20 travels in such an area, many false alarms may occur (e.g., in the X band and K band), causing the user to ignore the audible and/or visual alarms, which with the benefit of history for that particular radar detector 20 traveling that particular route, could be reliably identified as false alarms. But without any historical records specific to the radar detector 20, false alarms cannot be distinguished from a radar gun.

Thus, the previously existing technology for addressing the above discussed problems are problematic for multiple different technological reasons, including that creating history data is relatively computationally expensive and may require substantial processing or computation power (e.g., expensive processor components and higher battery or power consumption), large memory required for storage of data, potentially large amount of network traffic for non-local storage of data or backend processing. Further, to obtain optimal history data, the user may be required to perform various tasks which may deteriorate the user experience. Also, as noted above, the existing systems for radar detection are not well suited for driving in entirely new areas, as "pretrained data" may provide poor accuracy and results due to differences between devices from calibration. In other words, without a particular radar detector experiencing actual law enforcement signals (e.g., radar signals, laser signals), the reliability of any alarm suppression techniques is computationally burdensome and/or frequently ineffective. The present disclosure advantageously provides a more computationally lightweight process that achieves greater reliability at false alarm suppression.

A computationally lightweight process for determining whether to suppress alarms may be achieved, even when a particular radar detector 20 has never traveled in a geographic region (e.g., in a new state or new county) by using a geofence lockout. The geofence lockout has a geofenced area associated with one or more locked out frequency bands (e.g., X band, K band) in which the radar detector 20 suppresses alarms at any location within the geofenced area associated with the one or more locked out frequency bands. The geofenced area includes many cells used for location lockout, typically dozens or hundreds of cells. The geofenced area may correspond to a state, a province, a city, a county, or the like. The geofenced area may be determined in several ways, discussed further below. The radar detector 20 may store coordinates and/or boundaries of the geofenced area and the one or more associated locked out frequency bands.

Figure 7:
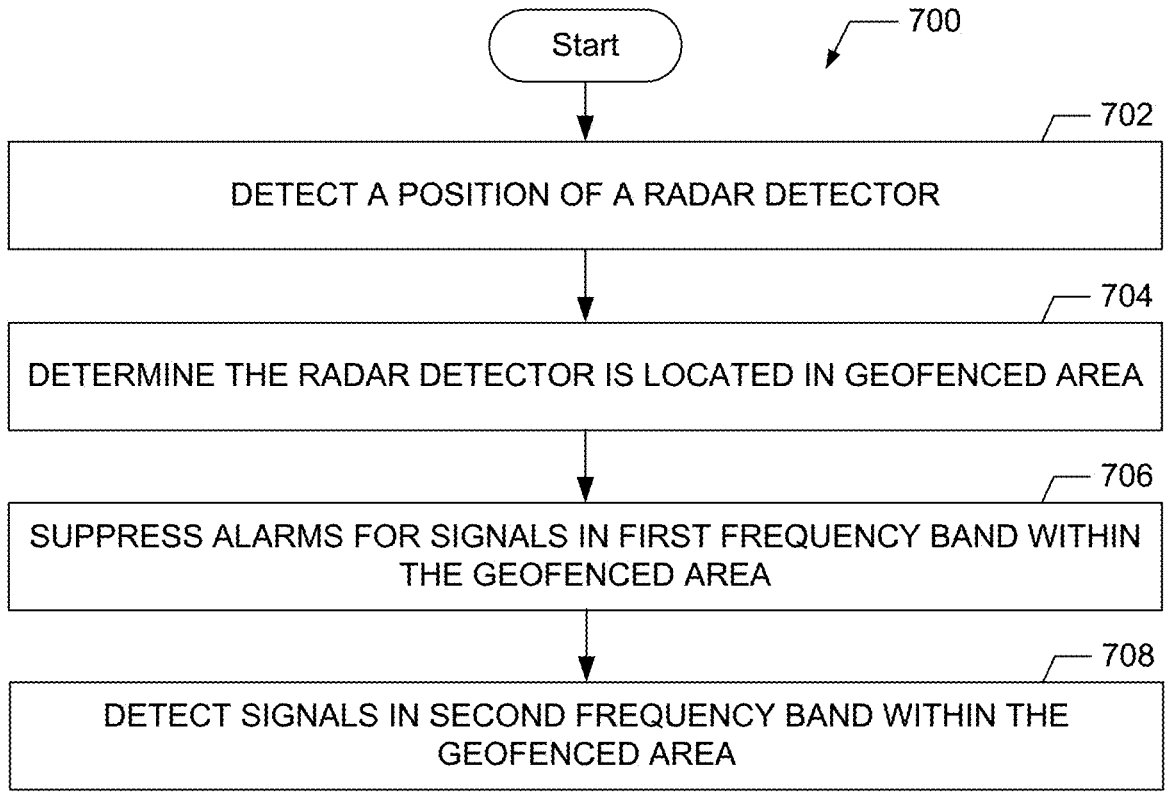
FIG. 7 is a flow chart of operations using an example geofencing lockout process.

As illustrated in FIG. 7, which shows a process 700, a radar detector 20 may detect its position at step 702. For example, the radar detector 20 uses a GPS receiver to detect its current position coordinates. The position coordinates may be used by the processor 22 to determine a geographic area referred to as a cell. Using the position of the radar detector 20, the processor 22 may determine that the radar detector device is located in a geofenced area at step 704. For example, the processor 22 may determine geofenced boundaries using geofenced coordinates of a geofenced area. If the radar detector 20 crosses a boundary between two sets of coordinates, the processor 22 may determine the radar detector 20 has entered the geofenced area. In another example, a geofenced area is associated with a list of edge cells, which when entered trigger a geofence analysis. It should be appreciated that a geofenced area may be much larger than a single cell, such as hundreds or thousands of times larger, in which case a list of every cell within the geofenced area may be unnecessary to reliably detect entry into the geofenced area. In such a case, depending on the size of a cell, one or two border or edge cells along the perimeter of the geofenced area may be used to detect entry into and exit from a geofenced area. In another example, a border area or edge area of the geofenced area may be several cells (e.g., 5 or 10) thick to ensure reliable detection of entry or exit of a geofenced area. Further, since the geofenced area is large, the processing of determining whether the radar detector 20 is located in the geofenced area need not be performed as frequently as is required to determine that the radar detector is passing from one cell to another cell, which may further save on processing requirements. Similarly, if the radar detector is deep inside a geofenced area, it may be physically impossible for the radar detector to exit the geofenced area for many minutes, in which case the process of determining whether the radar detector device is still located in the geofenced area may be put to sleep for a period of minutes.

When the radar detector 20 is located in a geofenced area, at step 706, the processor 22 may suppress alarms for signals in a first frequency band. For example, the processor 22 suppresses warnings for a first frequency band (e.g., X band, K band) which is associated with the geofenced area. In another example, the geofenced area is associated with several frequency bands that will reliably cause false alarms throughout the geofenced area, such as the X band, the K band, and the Ka band. In an alternative example, where the police units may only use radar guns in the Ka band, a geofenced area is associated with several lockout frequency bands (e.g., in the X band, K band, and laser frequency band). Although the entire geofenced area, which includes a geographic region of a matrix of at least M cells by N cells, locks out certain frequency bands, at least one frequency band remains active. In an example embodiment, the first frequency band may be an entire frequency band, or alternatively, may be a segment of a frequency band (e.g., 50 MHz of X band) or multiple contiguous or discontiguous segments of the frequency band. The at least one frequency band that remains active, when received by a receiver device (e.g., detector 24 and/or 28), is processed according to the above referenced description, and may produce alarms or warnings indicative of speed detection by police units. Thus, at step 708, the processor 22 may detect signals in a second frequency band within the geofenced area. For example, the receiver device may receive a Ka band signal or a laser signal, which may be processed by the DSP 26, the results of which are provided to the processor 22, which detects the Ka band or laser signal and provides an alarm to the user within the geofenced area. For example, the alarm may be an audible warning, a light display, a haptic alert, or any suitable warning. In an example, the geofenced area may also include a location lockout area for the second frequency band at a known stationary source for signals in the second frequency band at a specific position within the geofenced area, which was a user defined location lockout area or a threshold defined location lockout area, and alarms are suppressed for the second frequency band at the specific position within the geofenced area. In an example embodiment, the second frequency band may be an entire frequency band, or alternatively, may be a segment of a frequency band or multiple contiguous or discontiguous segments of the frequency band. In a typical example, the geofenced area may be at least one or more orders of magnitude larger than the location lockout area for the stationary source of the second frequency band.

In an example, the geofence locked out frequency bands may be non-contiguous frequency bands. For example, the geofenced lockout includes at least two non-contiguous frequency bands (e.g., in K band and X band). In another example, the geofenced lockout includes at least three non-contiguous frequency bands (e.g., X band, K band, Ka band, or X band, K band, laser band). In a typical scenario, a signal locked out based on a geofenced lockout may be output by a stationary source (e.g., door opener). In some example embodiments, signals locked out based on a geofenced lockout may be spurious signals from one or more non-stationary sources.

The geofence lockout differs from the location based lockout in that no historical data of the specific radar detector device is required to reliably suppress alarms in the geofenced area for the associated one or more locked out frequency bands. For example, the radar detector 20 may have received no input inside the geofenced area on a locked out frequency band from the user. Similarly, for example, the radar detector 20 may have not met any threshold of incidents (e.g., ignore threshold, silent threshold) inside the geofenced area on a locked out frequency band. Rather, the alarms for the locked out frequency band are suppressed based only on the device being physically located within the geofenced area, independent of specific position within the geofenced area. Thus, the alarms for the first frequency band may be suppressed at all positions within the geofenced area. In a typical example embodiment, the geofenced area is greater than 1 square mile, and may be many square miles, for example, covering an entire county or city where one or more frequency bands have been determined to reliably not be related to actual police or law enforcement activity, but rather, as being related to spurious signals that are merely false alarms. In an example, the present radar detector 20 may provide highly accurate position detection (e.g., less than 3 meters) within cells and the geofenced area. The geofenced area includes many cells, each of which has a standard and uniform shape and size, and corresponds to a set of geographic coordinates, while the geofenced area has a different shape than each of the cells. For example, the cells may be generally circular, square, rectangular, quadrilateral, hexagonal, triangular, or the like, while the geofenced area may be any irregular or non-isometric shape (e.g., following municipal boundaries, rivers, roads, ridgelines, shorelines). Regardless of which cell a radar detector 20 is in within the boundaries of a geofenced area, the associated frequency band or frequency bands for that geofenced area may have any alarms suppressed, such that the specific position within a geofenced area is irrelevant and need not be tracked with respect to signals received in the geofenced frequency band or bands. In other words, the suppressed alarms are not suppressed based on their specific position (e.g., GPS coordinates or cell), but rather, only based on their inclusion within the geofenced area.

In another example embodiment, suppressing alarms for detecting signals in the first frequency band includes adjusting a sensitivity of the radar detector 20 with respect to signals in the first frequency band. For example, based on a user indication and/or threshold historical activity of the particular radar detector 20, the sensitivity of the radar detector 20 to signals in the X frequency band is reduced by a decibel increment, such as by 10 dB or 6 dB or 3 dB. This allows the radar detector 20 to minimize the amount of nuisance alarms experienced in response to moving into a new cell. For example, a radar detector 20 that moves from a cell where the police units may only use radar guns in the X band to a cell where the police units use radar guns in the K band can decrease the detector's sensitivity to signals in the X band, as it is unlikely that any X band signals received in the new cell correspond to police radar signals. In this way, the radar detector 20 may reduce the amount of nuisance or false alarms triggered by X band signals, while still processing these signals. This allows users who are not familiar with the different bands of radio frequency signals used by different police units the ability to detect and be alerted to police radio signals from different police units, while minimizing the amount of nuisance alarms in a given area.

Figure 8:
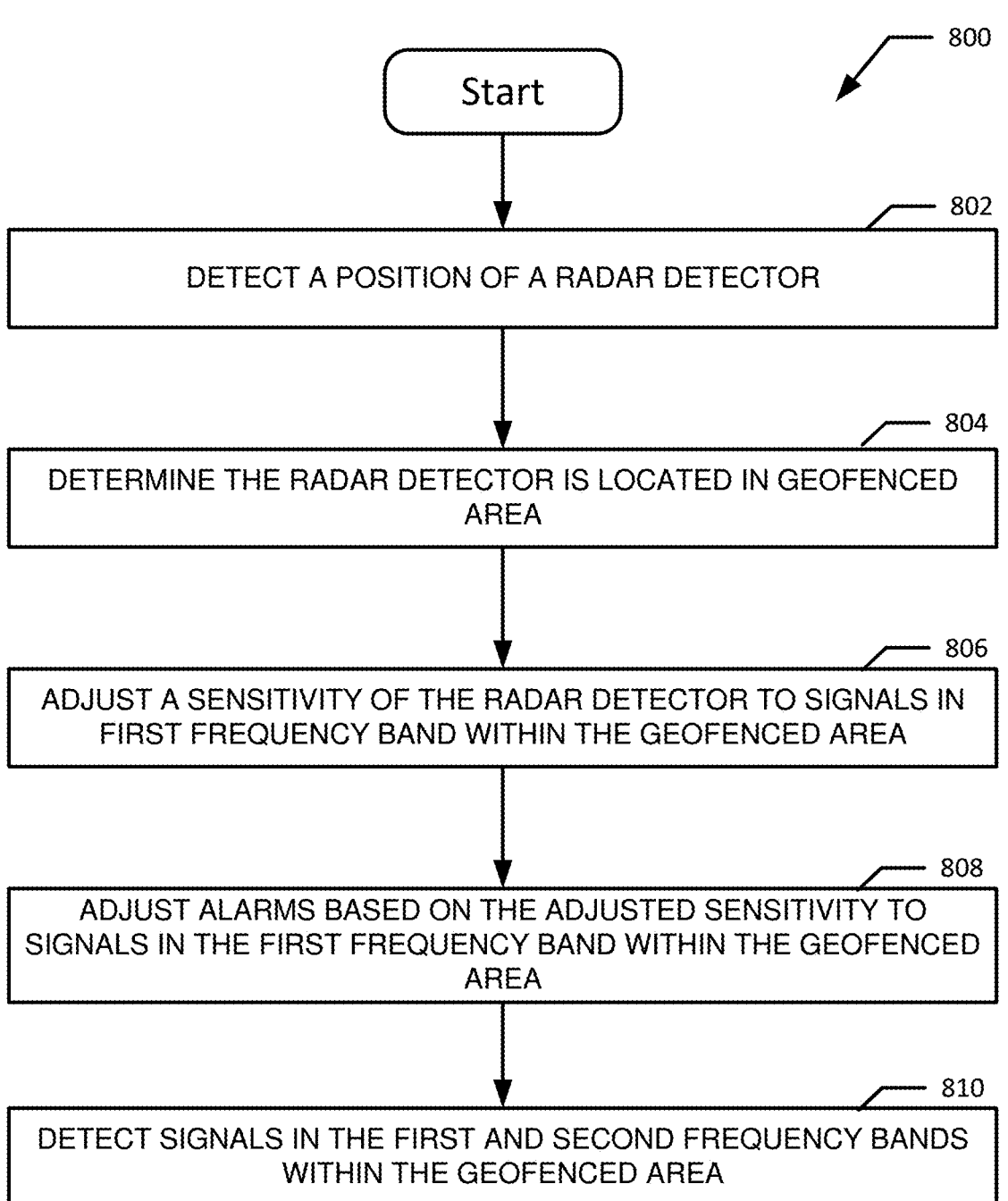
FIG. 8 is a flow chart of operations using an additional example geofencing lockout process.

As illustrated in FIG. 8, which shows a process 800, a radar detector device 20 may detect its position at step 802. For example, the radar detector 20 may use a GPS receiver to detect its current position coordinates. Using these position coordinates, the radar detector 20 may determine it is located in a geofenced area at step 804. For example, the processor 22 of the radar detector 20 may determine geofenced boundaries using geofenced coordinates of a geofenced area. If the radar detector 20 crosses a boundary between two sets of coordinates, the processor 22 may determine the radar detector 20 has entered the geofenced area.

Once determining that it is located in a geofenced area, at step 806, the radar detector 20 may adjust a sensitivity of the radar detector 20 to signals in a first frequency band within the geofenced area. For example, the radar detector 20 may increase the minimum amount of power required at the input of the receiver a signal in a first frequency band within the geofenced area must have in order to be detected by the radar detector 20. For instance, a radar detector 20 that has determined it is in a geofenced area may reduce its sensitivity to signals in the Ka frequency band, such that received signals in the Ka frequency band within the geofenced area are required to be of a requisite signal strength in order to detect a police radar signal. Further, at step 808, alarms provided to a user are adjusted as a result of the adjusted sensitivity. Continuing with the previous example, as a result of the reduced sensitivity to signals in the Ka frequency band within the geofenced area, a radar detector 20 that receives signals in the Ka band which fail to meet the adjusted sensitivity will subsequently not alert a user of the radar detector to a detected police radar signal. At step 810, the radar detector 20 may detect signals within a second frequency band in addition to a signals in the first frequency band. For example, the radar detector may detect signals in the Ka frequency band, given that the received signals meet an adjusted sensitivity requirement of the detector 20, and signals in the X frequency band, such as police radar signals from a radar gun.

Further, the adjustment of the sensitivity of the radar detector may include the continuous adjustment of the sensitivity. This results in a continuously variable sensitivity that is constantly adjusted in order to adapt to the changing frequency spectrum associated with moving among cells within a geofenced area. For example, the sensitivity may be adjust based on an algorithm, such as a linear reduction algorithm, that results in a linear reduction of the dB level from a geofenced boundary to a specified distance from the boundary (e.g. 5 miles from the state line).

In another additional example embodiment, suppressing alarms for detecting signals in the first frequency band includes modifying a detection threshold (e.g. silent or ignore thresholds, as described above) of the radar detector 20 with respect to signals in the first frequency band. For example, a radar detector 20 that moves from a cell where the police units may only use radar guns in the K band to a cell where the police units use radar guns in the Ka band can modify a threshold related to the detector's processing of signals in the K band, as it is unlikely that any K band signals received in the new cell correspond to police radar signals. This helps to reduce the amount of nuisance or false alarms triggered by K band signals, while still processing these signals. This also benefits users who are not familiar with the different bands of radio frequency signals used by different police units by detecting and alerting these users to police radio signals from different police units, while minimizing the amount of nuisance alarms in a given area where a given frequency band is generally known to not be utilized by police units.

Figure 9:
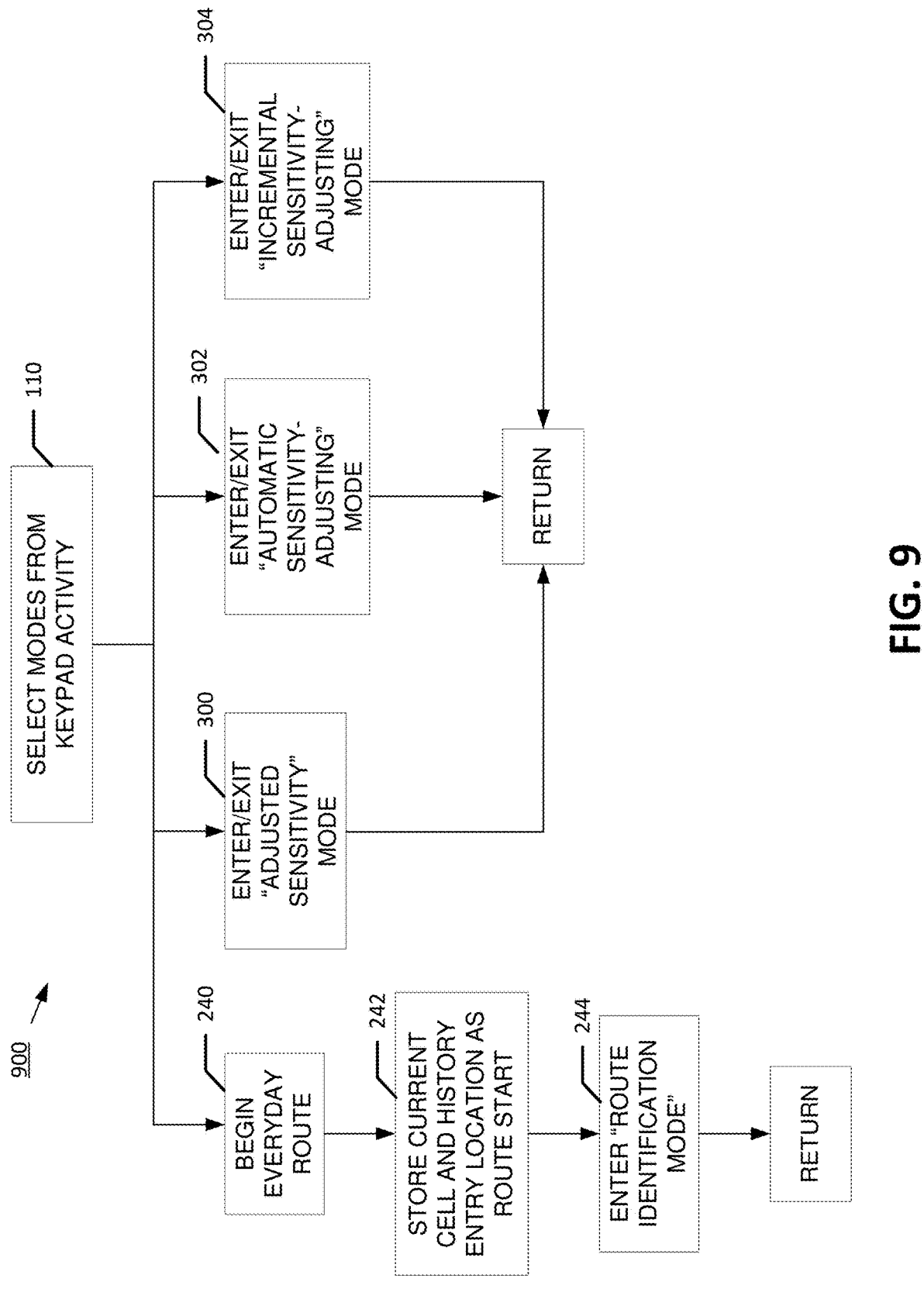
FIG. 9 is a flow chart of operations of the CPU of FIG. 2 in responding to keypad activity to change operative mode of the GPS enabled radar detector.

Referring to FIG. 9, process 900 may include detecting keypad activity on keypad 36 and processing this activity to alter operating modes of the GPS enabled radar detector, as described above in further detail with reference to FIG. 6E. The operative modes selectable via keypad 36 may include initiating an everyday route mode (step 240) as described above in further detail with reference to FIG. 6E. Selecting an operative mode via keypad 36 may further include entering an "adjusted sensitivity" mode (step 300). In this mode, when a given frequency band is known to contain spurious police radar signals, police radar frequencies in the given band detected by the receiver are taken to be from non-police sources if they fail to meet an adjusted sensitivity of the radar detector.

Additionally, the operative modes selectable via keypad 36 may further include an "automatic sensitivity-adjusting" mode (step 302). In this mode, when a given frequency band is known to contain spurious police radar signals, police radar frequencies in the given band detected by the receiver are taken to be from non-police sources if they fail to meet an adjusted sensitivity of the radar detector, the sensitivity of the radar detector being continuously variable based on the position of the radar detector.

Also, the operative modes selectable via keypad 36 may further include an "incremental sensitivity-adjusting" mode (step 304). In this mode, for a given frequency band known to contain spurious police radar signals, police radar frequencies in the given band detected by the receiver are taken to be from non-police sources if they fail to meet an adjusted sensitivity of the radar detector and wherein this adjusted sensitivity is incrementally adjusted as the radar detector moves traverses a geofence boundary.

Figure 10:
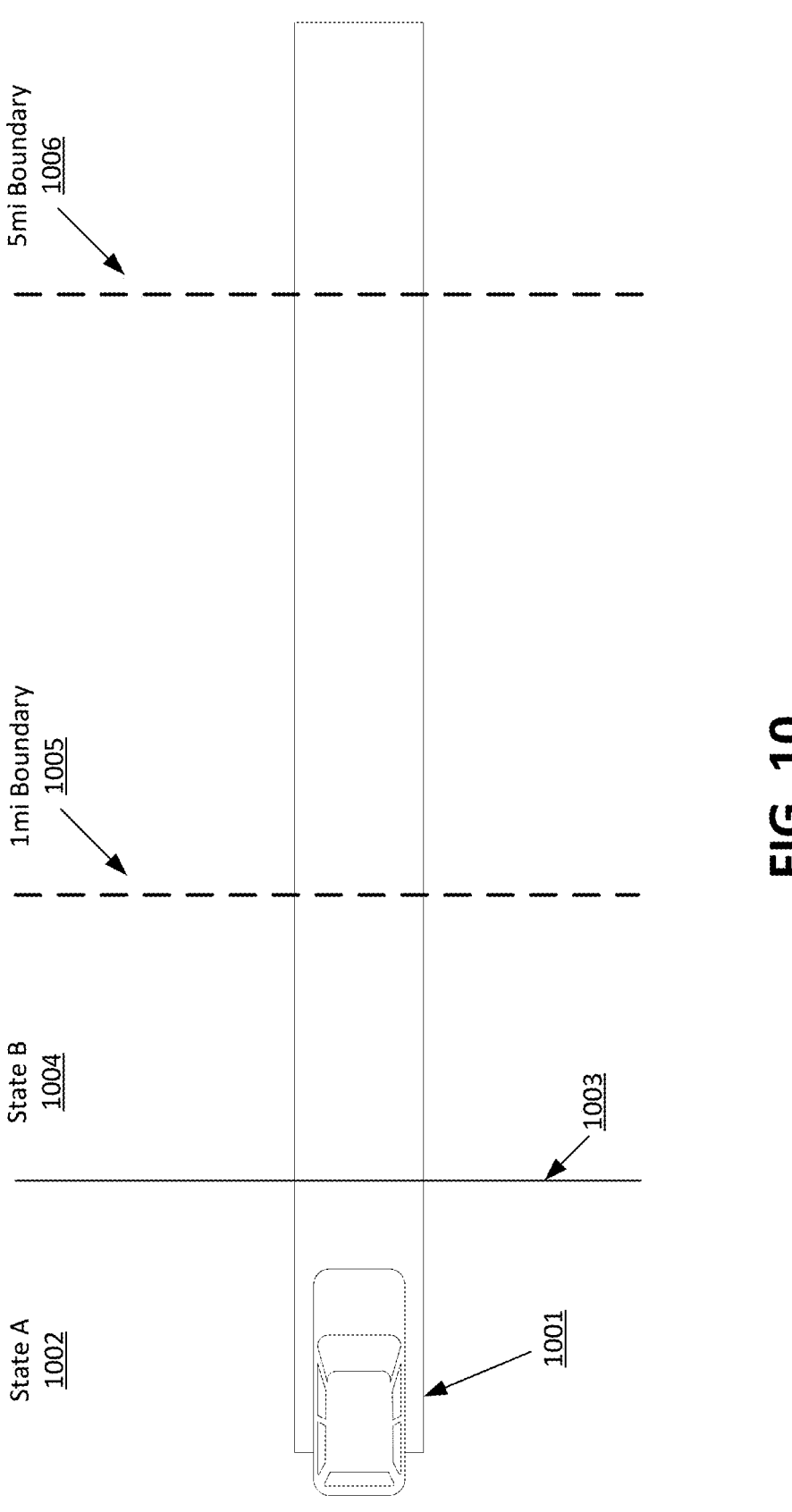
FIG. 10 is an illustration of an example embodiment of the present disclosure.

FIG. 10 illustrates an example with boundaries which may be used by the radar detector in an incremental sensitivity-adjusting mode. In FIG. 10, a vehicle 1001 equipped with a radar detector according to the present disclosure travels down a road in State A 1002 toward State B 1004, where state line 1003 acts as a geofence boundary between State A 1002 and State B 1004. In response to the radar detector traversing state line 1003, a sensitivity of the radar detector is adjusted. Additionally, in response to the radar detector traversing one mile boundary 1005, the sensitivity may be further adjusted, and this sensitivity may be even further adjusted when the radar detector traverses the five mile boundary 1006.

For example, vehicle 1001 equipped with a radar detector according to the present disclosure may travel across state line 1003. It may be known to the radar detector that law enforcement uses a first frequency in State A 1002, while State B 1004 law enforcement uses a second frequency. For example, State A 1002 may utilize signals in the X band for radar detection, while State B 1004 may utilize signals in the K band. Accordingly, when the radar detector traverses state line 1003, the sensitivity of the radar to signals in the first frequency may be adjusted. For instance, upon traversing state line 1003, the radar detector may adjust its sensitivity to signals in the X band by 3 dB. This may help avoid nuisance or false alarms when signals in different frequency bands are received.

Additionally, the sensitivity of the radar detector may be further incrementally adjusted. For example, after traversing state line 1003, the radar detector equipped in vehicle 1001 may further reduce its sensitivity to signals in the X band by an additional 3 dB (6 dB total) once the detector moves a specified distance from the geofenced boundary/state line 1003 (e.g. past 1 mile boundary 1005. Also, the radar detector may further reduce its sensitivity to signals in the X band by an additional 4 dB (10 dB total) once the detector moves a specified distance from the geofenced boundary/state line 1003 (e.g. past 5 mile boundary 1006).

As discussed above, the size of the geofenced area may be substantially larger than the size of a cell, and is typically larger than a maximum effective range of the radar detector 20. Thus, the difference between a geofenced area and a location lockout area is readily understood by those skilled in the art. As the effective range of the radar detector 20 may typically fit entirely within with geofenced area, it should be appreciated that the treatment of the entire geofenced area differs from that of a location lockout area, as described above, which is based on a user indication based on the user's experience and/or threshold historical activity from multiple incidents of the particular radar detector 20. In an example, a size of the geofenced area is at least an order of magnitude larger than a size of a location lockout area. In another example, the size of the geofenced area is at least two orders of magnitude larger than the size of the location lockout area. Typically, for example, the size of the area of a location based lockout is ⅛ square miles or less, while the geofenced area is greater than 1 square mile.

The advantageous effects of the present disclosure include omission of previously performed processing (e.g., CPU, memory operations, networking) and hardware (e.g., faster processors, more memory capacity, higher bandwidth). Specifically, the processor 22 may omit certain processing associated with the locked out frequency band within the geofenced area. For example, the processor 22 may omit storing a current cell and the first frequency in memory when signals including the first frequency are detected while the radar detector 20 is in the current cell. In another example, the processor 22 may omit comparisons of various stored data to one or more thresholds. In another example, the processor 22 may omit transmitting data to a database system for processing. In another example, the processor 22 may omit checking a list of coordinates or a list of cells which, if not for the determination to suppress alarms due to the geofenced area, would need to be checked to determine whether a frequency lockout is in effect, or any other similar checks. In another example, the processor 22 may omit determining whether audible or visual alarms are suppressed based on a previously input user instruction, such as determining whether a warning suppression mode is implemented by the user. Thus, the use of a geofenced lockout as described herein may alleviate some of the computational burden on the radar detector 20 which may continue to process non-geofenced frequency bands as discussed above, for example in accordance with FIGS. 6B-6D. In an example embodiment, some or all of the steps of FIGS. 6C and 6D may be omitted, which reduces processing, as well as hardware and energy requirements. It should be appreciated that the above example process is not intended to limit the disclosed process, and that other methods of providing a geofenced lockout may be implemented in any suitable GPS enabled or position aware radar detector. Further, it should be appreciated that, as used herein, the term radar detector or radar gun is intended to cover radar signals as well as laser signals that may be transmitted and received by respective devices in the context of law enforcement activity and policing of speed on the roadways. A given radar gun may have only one frequency band used for detecting speed (e.g., laser 904 nm), and thus, as used herein, a radar gun need not include any particular radar frequency band (e.g., X band, K band, or Ka band).

In an example embodiment, a database system may include one or more processors, memory devices, network devices, and the like configured to store one or more databases for processing of the above discussed information received from radar detection incidents, user inputs, etc., and configured for communication with radar detector devices 20. The database system may be a backend system that includes various types of data, e.g., for aggregated data processing, individual device data processing to lessen local device processing requirements, data storage to lessen local device memory requirements, or the like. For example, the database system may include data as illustrated in FIGS. 3-5. In an example, the database system may include alert or alarm information, including users' indications of false alarms, confirmed radar gun detection or police stakeout spotted, reported traffic incident data, and the location coordinates (e.g., GPS) and any detected frequency band data associated with any such incident or report.

As time goes by, police departments may occasionally update their fleet of radar guns in operation in patrol cars. Purchases of radar guns made by a police department may be public information. The database system may obtain this public information to determine when a police department has obtained a certain type of radar gun (e.g., Ka band) in a sufficient quantity to outfit all patrol units with that particular type of radar gun. This purchase information may be used to trigger execution of threshold analysis on an area of operation for the police department to determine a proposed geofence area for given frequency band, and based on aggregated data from multiple users' radar detectors 20, to confirm the proposed geofenced area as suitably reliable to suppress alarms in the given frequency band.

The database system may accordingly provide ample data to confirm geofenced boundaries through a lack of confirmed radar gun detections and reported false alarms (e.g., in K band, in X band), for example, through aggregation of data from multiple radar detectors 20 traveling on different routes within a geographic area which may be suitable for bounding as a geofenced area for signals in one or more frequency bands. The database system may enable a processor to determine geofenced areas and confirm the geofenced areas, using appropriate threshold levels for an entire geofenced area of confirmed alarms and false alarms reported to confirm sufficient accuracy of the geofenced lockout area.

Also, in some cases where a geofenced area in which alarms of a given frequency back are suppressed may be larger than a respective area where alarms of the given frequency band are activated, it may be beneficial to switch a default setting from active to suppressed. For example, if a geofenced area is larger than the area outside of the geofenced area, the area which is geofenced may be inverted or opposite, and the default setting of alarms defaulting to being active or on, is reversed so that the default setting is that alarms are suppressed or off. Thus, in a large area which would have alarms of a given frequency band (e.g., X band) normally active and only suppressed within a geofenced area and at individual lockout locations, a default setting may be toggled from "default on" to "default off" so that the given frequency band is normally suppressed (e.g., with the radar detection turned off to save power) and only active when inside the geofenced area. In this way, the geofenced area may be made smaller, and instead of triggering suppression of alarms when the alarms are set to default on, crossing into the geofenced area triggers activation of otherwise suppressed alarms. In some circumstances, toggling this default setting may enable less bandwidth usage and processing, by reducing the size of geofenced areas and/or geofence boundaries.

Thus, the present disclosure may provide a radar detector 20 that is reliably effective while reducing the amount of data to be collected, stored, processed, and/or transmitted. This reduction in computational load may provide substantial and advantageous reductions in hardware costs, power usage, memory usage, bandwidth, and the like, while also providing an improved usability for users, especially when traveling in entirely new areas.

In an example embodiment, a radar detector device comprises: a receiver device configured to detect a plurality of signals generated in a context of law enforcement activity across a plurality of different frequency ranges; and a processor, wherein the processor is configured to: detect a position of the radar detector device; determine that the radar detector device is located in a geofenced area; suppress alarms for signals in a first frequency band within the geofenced area; and detect signals in a second frequency band within the geofenced area.

In accordance with another example aspect of the present disclosure, which may be used in combination with any one or more of other aspects described herein, the radar detector device has received no input inside the geofenced area on the first frequency band.

In accordance with another example aspect of the present disclosure, which may be used in combination with any one or more of other aspects described herein, the radar detector device has not met a threshold of incident inside the geofenced area on the first frequency band.

In accordance with another example aspect of the present disclosure, which may be used in combination with any one or more of other aspects described herein, the alarms for the first frequency band are suppressed based only on the device being within the geofenced area, independent of specific position within the geofenced area.

In accordance with another example aspect of the present disclosure, which may be used in combination with any one or more of other aspects described herein, the alarms for the first frequency band are suppressed at all positions within the geofenced area.

In accordance with another example aspect of the present disclosure, which may be used in combination with any one or more of other aspects described herein, the geofenced area is greater than 1 square mile.

In accordance with another example aspect of the present disclosure, which may be used in combination with any one or more of other aspects described herein, the location accuracy of the radar detector device is within 3 meters.

In accordance with another example aspect of the present disclosure, which may be used in combination with any one or more of other aspects described herein, the geofenced area includes a plurality of cells, wherein each cell has a standard and uniform shape and size.

In accordance with another example aspect of the present disclosure, which may be used in combination with any one or more of other aspects described herein, each cell respectively corresponds to a set of geographic coordinates.

In accordance with another example aspect of the present disclosure, which may be used in combination with any one or more of other aspects described herein, the geofenced area has a different shape than each of the cells.

In accordance with another example aspect of the present disclosure, which may be used in combination with any one or more of other aspects described herein, the geofenced area is larger than a maximum effective range of the radar detection device.

In accordance with another example aspect of the present disclosure, which may be used in combination with any one or more of other aspects described herein, a first size of the geofenced area is at least an order of magnitude larger than a second size of an area of a location based lockout.

In accordance with another example aspect of the present disclosure, which may be used in combination with any one or more of other aspects described herein, a first size of the geofenced area is at least two orders of magnitude larger than a second size of an area of a location based lockout.

In accordance with another example aspect of the present disclosure, which may be used in combination with any one or more of other aspects described herein, a first size of the geofenced area is at least three orders of magnitude larger than a second size of an area of a location based lockout.

In accordance with another example aspect of the present disclosure, which may be used in combination with any one or more of other aspects described herein, a size of an area of a location based lockout is ⅛ square miles or less, and the geofenced area is greater than 1 square mile.

In accordance with another example aspect of the present disclosure, which may be used in combination with any one or more of other aspects described herein, a size of an area of a location based lockout is ½ square miles or less, and the geofenced area is greater than 10 square miles.

In accordance with another example aspect of the present disclosure, which may be used in combination with any one or more of other aspects described herein, a size of an area of a location based lockout is 1 square miles or less, and the geofenced area is greater than 100 square miles.

In accordance with another example aspect of the present disclosure, which may be used in combination with any one or more of other aspects described herein, wherein the first frequency band is one of a segment of X band, a segment of K band, a segment of Ka band, or a segment of laser band.

In accordance with another example aspect of the present disclosure, which may be used in combination with any one or more of other aspects described herein, the processor is further configured to omit processing associated with the first frequency band within the geofenced area.

In accordance with another example aspect of the present disclosure, which may be used in combination with any one or more of other aspects described herein, the omitted processing includes storing a current cell and the first frequency in memory.

In accordance with another example aspect of the present disclosure, which may be used in combination with any one or more of other aspects described herein, the omitted processing includes comparing stored data to a threshold.

In accordance with another example aspect of the present disclosure, which may be used in combination with any one or more of other aspects described herein, the omitted processing includes transmitting data to a database system for processing.

In accordance with another example aspect of the present disclosure, which may be used in combination with any one or more of other aspects described herein, the omitted processing includes checking a list of coordinates or a list of cells.

In accordance with another example aspect of the present disclosure, which may be used in combination with any one or more of other aspects described herein, the omitted processing includes determining whether audible or visual alarms are suppressed based on a previously input user instruction.

In accordance with another example aspect of the present disclosure, which may be used in combination with any one or more of other aspects described herein, a default setting may be toggled such that a frequency band is set to default on or default off.

In accordance with another example aspect of the present disclosure, which may be used in combination with any one or more of other aspects described herein, when the default setting for a given frequency band is default on, traversing a geofence boundary suppresses an alarm for the given frequency band, and when the default setting for a given frequency band is default off, traversing a geofence boundary activates an alarm for the given frequency band.

In accordance with another example aspect of the present disclosure, which may be used in combination with any one or more of other aspects described herein, toggling a default setting from default on to default off reduces an amount of data transmitted to and/or from a radar detector device.

In accordance with another example aspect of the present disclosure, which may be used in combination with any one or more of other aspects described herein, a radar detector device comprises: a receiver device configured to detect a plurality of signals generated in a context of law enforcement activity across a plurality of different frequency ranges; and a processor, wherein the processor is configured to: detect a position of the radar detector device; determine that the radar detector device is located in a geofenced area; activate alarms for signals in a first frequency band within the geofenced area; and detect signals in a second frequency band within the geofenced area.

In accordance with another example aspect of the present disclosure, which may be used in combination with any one or more of other aspects described herein, the geofenced area for a given frequency band set to default on is greater than 100 square miles.

In accordance with another example aspect of the present disclosure, which may be used in combination with any one or more of other aspects described herein, the geofenced area for a given frequency band set to default on is greater than 1,000 square miles.

In accordance with another example aspect of the present disclosure, which may be used in combination with any one or more of other aspects described herein, the geofenced area for a given frequency band set to default off is greater than 100 square miles.

In accordance with another example aspect of the present disclosure, which may be used in combination with any one or more of other aspects described herein, the geofenced area for a given frequency band set to default off is greater than 1,000 square miles.

In accordance with another example embodiment of the present disclosure, aspects of which may be used in combination with any one or more of other aspects described herein, a radar detector device comprises: a receiver device configured to detect a plurality of signals generated in a context of law enforcement activity across a plurality of different frequency ranges; and a processor, wherein the processor is configured to: detect a position of the radar detector device; determine that the radar detector device is located in a geofenced area; adjust a sensitivity of the radar detector device to signals in a first frequency band within the geofenced area; suppress alarms based on the adjusted sensitivity to signals in the first frequency band within the geofenced area; and detect signals in the first frequency band and signals in a second frequency band within the geofenced area.

In accordance with another example aspect of the present disclosure, which may be used in combination with any one or more of other aspects described herein, the sensitivity of the of the radar detector device is a requirement of the receiver device, the requirement is a minimum received power requirement for signals in the first frequency band of the receiver device.

In accordance with another example aspect of the present disclosure, which may be used in combination with any one or more of other aspects described herein, alarms for signals in the first frequency band are suppressed based on the device being within the geofenced area and the requirement being met.

In accordance with another example aspect of the present disclosure, which may be used in combination with any one or more of other aspects described herein, the sensitivity of the of the radar detector device is a threshold set comprising an ignore threshold and a silent threshold.

In accordance with another example aspect of the present disclosure, which may be used in combination with any one or more of other aspects described herein, the processor is configured to adjust the sensitivity of the radar detector device by reducing the sensitivity by an increment of 10 db.

In accordance with another example aspect of the present disclosure, which may be used in combination with any one or more of other aspects described herein, the processor is configured to adjust the sensitivity of the radar detector device by reducing the sensitivity by an increment of 6 db or half of a range of the receiver device.

In accordance with another example aspect of the present disclosure, which may be used in combination with any one or more of other aspects described herein, the processor is configured to adjust the sensitivity of the radar detector device by reducing the sensitivity by an increment of 3 db or quarter of a range of the receiver device.

In accordance with another example aspect of the present disclosure, which may be used in combination with any one or more of other aspects described herein, wherein the processor is configured to continually adjust the sensitivity of the radar detector device based on the geofenced area.

In accordance with another example aspect of the present disclosure, which may be used in combination with any one or more of other aspects described herein, the processor is further configured determining whether audible or visual alarms associated with the first frequency band are suppressed based on a previously input user instruction.

In accordance with another example aspect of the present disclosure, which may be used in combination with any one or more of other aspects described herein, wherein the sensitivity of the of the radar detector device is a threshold set comprising an ignore threshold and a silent threshold.

In accordance with another example aspect of the present disclosure, which may be used in combination with any one or more of other aspects described herein, the sensitivity of the of the radar detector device is a requirement of the receiver device, the requirement is a minimum received power requirement for signals in the first frequency band of the receiver device.

In accordance with another example aspect of the present disclosure, which may be used in combination with any one or more of other aspects described herein, wherein alarms for signals in the first frequency band are activated based on the device being within the geofenced area and the requirement being met.

In accordance with another example aspect of the present disclosure, which may be used in combination with any one or more of other aspects described herein, wherein a default setting may be toggled such that a frequency band is set to default on or default off.

In accordance with another example aspect of the present disclosure, which may be used in combination with any one or more of other aspects described herein, wherein, when the default setting for a given frequency band is default on, traversing a geofence boundary suppresses an alarm for the given frequency band, and when the default setting for a given frequency band is default off, traversing a geofence boundary activates an alarm for the given frequency band.

In accordance with another example aspect of the present disclosure, which may be used in combination with any one or more of other aspects described herein, wherein the geofenced area for a given frequency band set to default on is greater than 100 square miles.

In accordance with another example aspect of the present disclosure, which may be used in combination with any one or more of other aspects described herein, wherein the geofenced area for a given frequency band set to default on is greater than 1,000 square miles.

In accordance with another example aspect of the present disclosure, which may be used in combination with any one or more of other aspects described herein, wherein the geofenced area for a given frequency band set to default off is greater than 100 square miles.

In accordance with another example aspect of the present disclosure, which may be used in combination with any one or more of other aspects described herein, wherein the geofenced area for a given frequency band set to default off is greater than 1,000 square miles.

In accordance with another example aspect of the present disclosure, which may be used in combination with any one or more of other aspects described herein, wherein toggling a default setting from default on to default off reduces an amount of data transmitted to and/or from a radar detector device.

In accordance with another example embodiment of the present disclosure, aspects of which may be used in combination with any one or more of other aspects described herein, a radar detector device comprises: a receiver device configured to detect a plurality of signals generated in a context of law enforcement activity across a plurality of different frequency ranges and a processor, wherein the processor is configured to detect a position of the radar detector device; determine that the radar detector device is located in a geofenced area; adjust a sensitivity of the radar detector device to signals in a first frequency band within the geofenced area; activate alarms for signals in a first frequency band within the geofenced area; and, detect signals in a second frequency band and a second frequency band within the geofenced area.

In accordance with another example aspect of the present disclosure, which may be used in combination with any one or more of other aspects described herein, wherein the sensitivity of the of the radar detector device is a threshold set comprising an ignore threshold and a silent threshold.

In accordance with another example aspect of the present disclosure, which may be used in combination with any one or more of other aspects described herein, wherein the sensitivity of the of the radar detector device is a requirement of the receiver device, the requirement is a minimum received power requirement for signals in the first frequency band of the receiver device.

In accordance with another example aspect of the present disclosure, which may be used in combination with any one or more of other aspects described herein, wherein alarms for signals in the first frequency band are activated based on the device being within the geofenced area and the requirement being met.

The disclosure in its broader aspects is therefore not limited to the specific details, representative apparatus and method, and illustrative example shown and described. Accordingly, departures may be made from such details without departing from the spirit or scope of applicant's general inventive concept.

The invention is hereby claimed as follows:

1. A radar detector device comprising:
a receiver device configured to detect a plurality of signals generated in a context of law enforcement activity across a plurality of different frequency ranges; and
a processor, wherein the processor is configured to:
detect a position of the radar detector device;

determine that the radar detector device is located in a geofenced area;
adjust a sensitivity of the radar detector device to signals in a first frequency band within the geofenced area;
suppress alarms based on the adjusted sensitivity to signals in the first frequency band within the geofenced area;
detect signals in the first frequency band and signals in a second frequency band within the geofenced area; and
continually adjust the sensitivity of the radar detector device based on the geofenced area.

2. The radar detector device of claim 1, wherein the sensitivity of the of the radar detector device is a requirement of the receiver device, the requirement is a minimum received power requirement for signals in the first frequency band of the receiver device.

3. The radar detector of claim 2, wherein alarms for signals in the first frequency band are suppressed based on the device being within the geofenced area and the requirement being met.

4. The radar detector device of claim 1, wherein the sensitivity of the of the radar detector device is a threshold set comprising an ignore threshold and a silent threshold.

5. The radar detector of claim 1, wherein the processor is configured to adjust the sensitivity of the radar detector device by reducing the sensitivity by an increment of 10 db.

6. The radar detector of claim 1, wherein the processor is configured to adjust the sensitivity of the radar detector device by reducing the sensitivity by an increment of 6 db or half of a range of the receiver device.

7. The radar detector of claim 1, wherein the processor is configured to adjust the sensitivity of the radar detector device by reducing the sensitivity by an increment of 3 db or quarter of a range of the receiver device.

8. The radar detector device of claim 1, wherein the processor is further configured determining whether audible or visual alarms associated with the first frequency band are suppressed based on a previously input user instruction.

9. The radar detector of claim 1, wherein a default setting may be toggled such that a frequency band is set to default on or default off.

10. The radar detector of claim 9, wherein, when the default setting for a given frequency band is default on, traversing a geofence boundary suppresses an alarm for the given frequency band, and when the default setting for a given frequency band is default off, traversing a geofence boundary activates an alarm for the given frequency band.

11. The radar detector of claim 9, wherein toggling a default setting from default on to default off reduces an amount of data transmitted to and/or from a radar detector device.

12. The radar detector of claim 9, wherein the geofenced area for a given frequency band set to default on is greater than 100 square miles.

13. The radar detector of claim 9, wherein the geofenced area for a given frequency band set to default on is greater than 1,000 square miles.

14. The radar detector of claim 9, wherein the geofenced area for a given frequency band set to default off is greater than 100 square miles.

15. The radar detector of claim 9, wherein the geofenced area for a given frequency band set to default off is greater than 1,000 square miles.

16. A radar detector device comprising:

a receiver device configured to detect a plurality of signals generated in a context of law enforcement activity across a plurality of different frequency ranges; and a processor, wherein the processor is configured to:

detect a position of the radar detector device;

determine that the radar detector device is located in a geofenced area;

adjust a sensitivity of the radar detector device to signals in a first frequency band within the geofenced area;

activate alarms for signals in a first frequency band within the geofenced area;

detect signals in a second frequency band and a second frequency band within the geofenced area; and continually adjust the sensitivity of the radar detector device based on the geofenced area.

17. The radar detector device of claim 16, wherein the sensitivity of the of the radar detector device is a threshold set comprising an ignore threshold and a silent threshold.

18. The radar detector of claim 17, wherein alarms for signals in the first frequency band are activated based on the device being within the geofenced area and the requirement being met.

19. The radar detector device of claim 16, wherein the sensitivity of the of the radar detector device is a requirement of the receiver device, the requirement is a minimum received power requirement for signals in the first frequency band of the receiver device.

* * * * *